(12) United States Patent
Ghosh et al.

(10) Patent No.: US 9,685,881 B2
(45) Date of Patent: Jun. 20, 2017

(54) AC-DC RECTIFIER SYSTEM

(71) Applicant: SCHNEIDER ELECTRIC IT CORPORATION, West Kingston, RI (US)

(72) Inventors: Rajesh Ghosh, Bangalore (IN); Damir Klikic, Waltham, MA (US); Mahendrakumar H. Lipare, Bangalore (IN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

(21) Appl. No.: 14/730,699

(22) Filed: Jun. 4, 2015

(65) Prior Publication Data

US 2016/0359427 A1 Dec. 8, 2016

(51) Int. Cl.
*H02M 7/217* (2006.01)
*H02M 1/42* (2007.01)
(Continued)

(52) U.S. Cl.
CPC ......... *H02M 7/217* (2013.01); *H02M 1/4233* (2013.01); *H02M 3/1582* (2013.01);
(Continued)

(58) Field of Classification Search
CPC ........ H02M 1/32; H02M 1/4208; H02M 7/12; H02M 7/217
(Continued)

(56) References Cited

U.S. PATENT DOCUMENTS 5,502,630 A * 3/1996 Rokhvarg ........... H02M 1/4208
 323/222
5,686,768 A 11/1997 Thomsen et al.
(Continued)

FOREIGN PATENT DOCUMENTS

CN 103427481 A 12/2013
EP 2020725 A2 2/2009
(Continued)

OTHER PUBLICATIONS

Pires, Vitor Fernao et al., "Single-Stage Double-Buck Topologies with High Power Factor", Journal of Power Electronics, vol. 11, No. 5, Sep. 2011, pp. 655-661.
(Continued)

*Primary Examiner* — Adolf Berhane
(74) *Attorney, Agent, or Firm* — Lando & Anastasi, LLP

(57) ABSTRACT

According to one aspect, embodiments of the invention provide a method for operating an AC-DC rectifier, the method comprising receiving, with a converter, input AC power having an input AC voltage waveform, controlling, during a positive half line cycle of the input AC voltage waveform, the converter to couple a second DC bus to ground, controlling, during the positive half line cycle of the input AC voltage waveform, the converter to maintain a positive DC link voltage on a first DC bus, controlling, during the positive half line cycle of the input AC voltage waveform, output circuitry to charge a first output capacitor and provide a positive output voltage to a positive output, and discharging, during the positive half line cycle of the input AC voltage waveform, a second output capacitor to provide a negative output voltage to a negative output.

40 Claims, 15 Drawing Sheets

(51) Int. Cl.
*H02M 3/158* (2006.01)
*H02M 3/335* (2006.01)
*H02M 7/219* (2006.01)
*H02M 1/00* (2006.01)

(52) U.S. Cl.
CPC ....... *H02M 3/33507* (2013.01); *H02M 7/219* (2013.01); *H02M 2001/0058* (2013.01); *Y02B 70/126* (2013.01); *Y02B 70/1491* (2013.01)

(58) Field of Classification Search
USPC ................. 363/50, 52, 81, 84, 89, 125, 127
See application file for complete search history.

(56) References Cited

U.S. PATENT DOCUMENTS

| | | | | |
|---|---|---|---|---|
| 7,209,374 | B2* | 4/2007 | Noro | H02M 3/33576 363/126 |
| 8,169,804 | B2 | 5/2012 | Tan et al. | |
| 8,487,546 | B2* | 7/2013 | Melanson | H05B 33/0839 315/291 |
| 8,503,199 | B1* | 8/2013 | Chapuis | H02M 3/33576 363/21.06 |
| 8,674,605 | B2* | 3/2014 | Puvanakijjakorn | H05B 33/0809 315/200 R |
| 9,093,919 | B2 | 7/2015 | Chapman et al. | |
| 2001/0033507 | A1* | 10/2001 | Li | H02M 7/48 363/132 |
| 2002/0118556 | A1 | 8/2002 | Johnson | |
| 2002/0149953 | A1 | 10/2002 | Smedley et al. | |
| 2006/0132111 | A1* | 6/2006 | Jacobs | G05F 1/618 323/282 |
| 2007/0069581 | A1 | 3/2007 | Mino | |
| 2008/0297248 | A1* | 12/2008 | Honda | H03F 3/2173 330/251 |
| 2009/0268496 | A1 | 10/2009 | Tan et al. | |
| 2009/0303762 | A1 | 12/2009 | Jang et al. | |
| 2011/0002148 | A1* | 1/2011 | Iturriz | H02M 7/10 363/126 |
| 2012/0024299 | A1 | 2/2012 | Scheu | |
| 2012/0182775 | A1 | 7/2012 | Tan et al. | |
| 2012/0242299 | A1 | 9/2012 | Xu et al. | |
| 2012/0249038 | A1* | 10/2012 | Wei | G01R 31/42 318/490 |
| 2014/0117867 | A1* | 5/2014 | Elferich | H05B 33/0815 315/201 |
| 2014/0125241 | A1* | 5/2014 | Elferich | H05B 33/0815 315/200 R |
| 2015/0036389 | A1* | 2/2015 | Freeman | H02M 1/10 363/16 |
| 2015/0295494 | A1* | 10/2015 | Gong | H05B 33/0815 315/224 |

FOREIGN PATENT DOCUMENTS

| | | |
|---|---|---|
| EP | 2405562 A1 | 1/2012 |
| JP | 2001197757 A | 7/2001 |
| WO | 2007105613 A1 | 9/2007 |
| WO | 2013/130054 A1 | 9/2013 |

OTHER PUBLICATIONS

Extended European Search Report from corresponding European Application No. 16172959.5 dated Nov. 14, 2016.

* cited by examiner

AC-DC RECTIFIER SYSTEM

BACKGROUND OF INVENTION

1. Field of Invention

The present invention relates generally to systems and methods for providing AC to DC rectification.

2. Discussion of Related Art

AC-DC rectifiers are commonly used in a variety of applications to convert supplied AC power into DC power having a desired voltage level. For example, AC-DC rectifiers are often used as chargers or front end converters in high frequency isolated Uninterruptible Power Supply (UPS) systems, in telecommunication systems for providing desired DC voltage (e.g., 48V) to a distribution bus, and in High Voltage Direct Current (HVDC) datacenter power supplies to provide desired DC voltage (e.g., 240V or 380V) to a distribution bus.

SUMMARY

At least one aspect of the invention is directed to an AC-DC rectifier comprising an input configured to be coupled to an AC power source and to receive input AC power from the AC power source having an input AC voltage waveform, a positive output configured to provide a positive output voltage to a load, a negative output configured to provide a negative output voltage to the load, a first DC bus, a second DC bus, a capacitor coupled between the first DC bus and the second DC bus, a converter coupled to the input, the first DC bus, and the second DC bus and configured to receive the input AC power from the input, the converter including a first switch coupled between the first DC bus and ground and a second switch coupled between the second DC bus and ground, output circuitry coupled to the converter, the positive output, and the negative output, a first output capacitor coupled between the positive output and ground, a second output capacitor coupled between the negative output and ground, and a controller coupled to the converter and the output circuitry, the converter configured, during a positive half line cycle of the input AC voltage waveform, to operate the first switch to remain in an open state, operate the second switch to couple the second DC bus to ground, operate the converter to maintain a positive DC link voltage on the first DC bus, and operate the output circuitry to charge the first output capacitor and provide the positive output voltage to the positive output.

According to one embodiment, during the positive half line cycle of the input AC voltage waveform, the second output capacitor is configured to discharge and provide the negative output voltage to the negative output. In another embodiment, the controller is further configured, during a negative half line cycle of the input AC voltage waveform, to operate the second switch to remain in an open state, operate the first switch to couple the first DC bus to ground, operate the converter to maintain a negative DC link voltage on the second DC bus, and operate the output circuitry to charge the second output capacitor and provide the negative output voltage to the negative output. In one embodiment, during the negative half line cycle of the input AC voltage waveform, the first output capacitor is configured to discharge and provide the positive output voltage to the positive output.

According to another embodiment, the output circuitry includes an inverter coupled to the converter, and a rectifier circuit coupled to the inverter, the positive output, and the negative output, wherein the inverter includes a third switch coupled between the first DC bus and the rectifier circuit and a fourth switch coupled between the second DC bus and the rectifier circuit, and wherein during the positive half cycle of the input AC voltage waveform, the controller is further configured to operate the third switch in a first buck mode of operation such that the rectifier circuit generates the positive output voltage. In one embodiment, during the negative half cycle of the input AC voltage waveform, the controller is further configured to operate the fourth switch in a second buck mode of operation such that the rectifier circuit generates the negative output voltage.

According to one embodiment, the output circuitry includes a first buck converter coupled to the converter and the positive output, the first buck converter including a third switch coupled between the first DC bus and the positive output, and a second buck converter coupled to the converter and the negative output, the second buck converter including a fourth switch coupled between the second DC bus and the negative output, wherein during the positive half cycle of the input AC voltage waveform, the controller is further configured to operate the third switch in a first buck mode of operation to generate the positive output voltage. In one embodiment, during the negative half cycle of the input AC voltage waveform, the controller is further configured to operate the fourth switch in a second buck mode of operation to generate the negative output voltage. In another embodiment, the first buck converter includes a first inductor coupled between the third switch and the positive output, the second buck converter includes a second inductor coupled between the fourth switch and the negative output, and the first inductor and the second inductor are implemented on a common core.

According to another embodiment, the controller is further configured to operate the converter and the output circuitry to provide Power Factor Correction (PFC) at the input. In one embodiment, the capacitor is a polypropylene capacitor. In another embodiment, the positive DC link voltage level is less than 400V.

Another aspect of the invention is directed to a method for operating an AC-DC rectifier including an input configured to receive input AC power having an input AC voltage waveform, a first DC bus, a second DC bus, a capacitor coupled between the first DC bus and the second DC bus, a converter coupled to the input, the first DC bus, and the second DC bus, output circuitry coupled to the converter, a first output capacitor coupled to the output circuitry, and a second output capacitor coupled to the output circuitry, the method comprising receiving, with the converter, the input AC power from the input, controlling, during a positive half line cycle of the input AC voltage waveform, the converter to couple the second DC bus to ground, controlling, during the positive half line cycle of the input AC voltage waveform, the converter to maintain a positive DC link voltage on the first DC bus, controlling, during the positive half line cycle of the input AC voltage waveform, the output circuitry to charge the first output capacitor and provide a positive output voltage to a positive output, and discharging, during the positive half line cycle of the input AC voltage waveform, the second output capacitor to provide a negative output voltage to a negative output.

According to one embodiment, the method further comprises controlling, during a negative half line cycle of the input AC voltage waveform, the converter to couple the first DC bus to ground, controlling, during the negative half line cycle of the input AC voltage waveform, the converter to maintain a negative DC link voltage on the second DC bus, controlling, during the negative half line cycle of the input AC voltage waveform, the output circuitry to charge the second output capacitor and provide the negative output voltage to the negative output, and discharging, during the negative half line cycle of the input AC voltage waveform, the first output capacitor to provide the positive output voltage to the positive output.

According to another embodiment, controlling the converter to couple the first DC bus to ground includes closing a first switch coupled between the first DC bus and ground. In one embodiment, controlling the converter to couple the second DC bus to ground includes closing a second switch coupled between the second DC bus and ground. In another embodiment, controlling the converter to maintain the positive DC link voltage on the first DC bus includes providing Pulse Width Modulation (PWM) control signals to a third switch coupled between the input and the second DC bus to generate the positive DC link voltage. In one embodiment, controlling the converter to maintain the negative DC link voltage on the second DC bus includes providing PWM control signals to a fourth switch coupled between the input and the first DC bus to generate the negative DC link voltage.

According to one embodiment, controlling the output circuitry to charge the first output capacitor and provide the positive output voltage to the positive output includes providing PWM controls signals to a fifth switch coupled between the first DC bus and the positive output to generate the positive output voltage. In another embodiment, controlling the output circuitry to charge the second output capacitor and provide the negative output voltage to the negative output includes providing PWM controls signals to a sixth switch coupled between the second DC bus and the negative output to generate the negative output voltage.

According to another embodiment, the method further comprises controlling the converter and the output circuitry to provide PFC at the input. In one embodiment, controlling the converter to maintain the positive DC link voltage on the first DC bus includes controlling the converter to maintain the positive DC link voltage at a level less than 400V.

One aspect of the invention is directed to an AC-DC rectifier comprising an input configured to be coupled to an AC power source and to receive input AC power from the AC power source having an input AC voltage waveform, a positive output configured to provide a positive output voltage a load, a negative output configured to provide a negative output voltage to the load, a first DC bus, a second DC bus, a capacitor coupled between the first DC bus and the second DC bus, at least one converter coupled to the input, the first DC bus, and the second DC bus and configured to receive the input AC power from the input, the at least one converter including a first switch coupled between the first DC bus and ground and a second switch coupled between the second DC bus and ground, output circuitry coupled to the at least one converter, the positive output, and the negative output, a first output capacitor coupled between the positive output and ground, a second output capacitor coupled between the negative output and ground, and a controller coupled to the at least one converter and the output circuitry, the at least one converter configured, during a positive half line cycle of the input AC voltage waveform, to operate the first switch to remain in an open state, operate the second switch to couple the second DC bus to ground, operate the at least one converter to maintain a positive DC link voltage on the first DC bus, operate the output circuitry to transfer energy from the capacitor to the first output capacitor to charge the first output capacitor and provide the positive output voltage to the positive output, and operate the output circuitry to transfer energy from the capacitor to the second output capacitor to charge the second output capacitor and provide the negative output voltage to the negative output.

According to one embodiment, the controller is further configured, during a negative half line cycle of the input AC voltage waveform, to operate the second switch to remain in an open state, operate the first switch to couple the first DC bus to ground, operate the at least one converter to maintain a negative DC link voltage on the second DC bus, operate the output circuitry to transfer energy from the capacitor to the first output capacitor to charge the first output capacitor and provide the positive output voltage to the positive output, and operate the output circuitry to transfer energy from the capacitor to the second output capacitor to charge the second output capacitor and provide the negative output voltage to the negative output.

According to another embodiment, the output circuitry includes a resonant converter coupled to the first DC bus, the second DC bus, the positive output, and the negative output. In one embodiment, the resonant converter includes a third switch coupled to the first DC bus, a fourth switch coupled to the second DC bus, and a resonant tank coupled to the third switch and the fourth switch, wherein in controlling the output circuitry, during the positive half cycle or the negative half cycle of the input AC voltage waveform, to transfer energy from the capacitor to the first output capacitor and the second output capacitor, the controller is further configured to provide PWM signals to the third switch and the fourth switch to generate a unipolar pulse and provide the unipolar pulse to the resonant tank.

According to one embodiment, the resonant tank includes a resonant capacitor coupled to the third switch and the fourth switch, and a resonant inductor coupled to the resonant capacitor, wherein the resonant capacitor is configured to receive the unipolar pulse, generate a bipolar pulse based on the unipolar pulse, and provide the bipolar pulse to the resonant inductor. In another embodiment, the resonant converter further includes, a first diode coupled between the resonant inductor and the positive output, the first diode configured to pass energy derived from a positive portion of the bipolar pulse to the first output capacitor to charge the first output capacitor and provide the positive output voltage to the positive output, and a second diode coupled between the resonant inductor and the negative output, the second diode configured to pass energy derived from a negative portion of the bipolar pulse to the second output capacitor to charge the second output capacitor and provide the negative output voltage to the negative output.

According to another embodiment, the controller is further configured to provide 50% duty cycle complementary PWM signals to the third switch and the fourth switch to generate the unipolar pulse. In one embodiment, the controller is further configured to turn on the third switch and the fourth switch with zero-voltage switching. In another embodiment, the controller is further configured to turn on the third switch and the fourth switch when current through each switch is negative. In one embodiment, the controller is further configured to operate the at least one converter to maintain the positive DC link voltage at a level less than 400V. In another embodiment, the capacitor, the first output capacitor, and the second output capacitor are polypropylene based capacitors. In one embodiment, the at least one converter includes three converters, each of the three converters configured to be coupled to a 3-phase AC power source and to receive one phase of 3-phase power provided by the 3-phase power source.

Another aspect of the invention is directed to a method for operating an AC-DC rectifier including an input configured to receive input AC power having an input AC voltage waveform, a first DC bus, a second DC bus, a capacitor coupled between the first DC bus and the second DC bus, a converter coupled to the input, the first DC bus, and the second DC bus, output circuitry coupled to the converter, a first output capacitor coupled to the output circuitry, and a second output capacitor coupled to the output circuitry, the method comprising receiving, with the converter, the input AC power from the input, controlling, during a positive half line cycle of the input AC voltage waveform, the converter to couple the second DC bus to ground, controlling, during the positive half line cycle of the input AC voltage waveform, the converter to maintain a positive DC link voltage on the first DC bus, controlling, during the positive half line cycle of the input AC voltage waveform, the output circuitry to transfer energy from the capacitor to the first output capacitor to charge the first output capacitor and provide a positive output voltage to a positive output, and controlling, during the positive half line cycle of the input AC voltage waveform, the output circuitry to transfer energy from the capacitor to the second output capacitor to charge the second output capacitor and provide a negative output voltage to a negative output.

According to one embodiment, the method further comprises controlling, during a negative half line cycle of the input AC voltage waveform, the converter to couple the first DC bus to ground, controlling, during the negative half line cycle of the input AC voltage waveform, the converter to maintain a negative DC link voltage on the second DC bus, controlling, during the negative half line cycle of the input AC voltage waveform, the output circuitry to transfer energy from the capacitor to the first output capacitor to charge the first output capacitor and provide the positive output voltage to the positive output; and controlling, during the negative half line cycle of the input AC voltage waveform, the output circuitry to transfer energy from the capacitor to the second output capacitor to charge the second output capacitor and provide the negative output voltage to the negative output.

According to another embodiment, the output circuitry includes a resonant converter having a resonant tank, a third switch coupled between the first DC bus and the resonant tank, and a fourth switch coupled between the second DC bus and the resonant tank, and controlling the output circuitry, during the positive half cycle or the negative half cycle of the input AC voltage waveform, to transfer energy from the capacitor to the first output capacitor and the second output capacitor includes providing PWM signals to the third switch and the fourth switch to generate a unipolar pulse. In one embodiment, providing PWM signals to the third switch and the fourth switch includes providing 50% duty cycle complementary PWM signals to the third switch and the fourth switch to generate the unipolar pulse.

According to one embodiment, controlling the output circuitry, during the positive half cycle or the negative half cycle of the input AC voltage waveform, to transfer energy from the capacitor to the first output capacitor and the second output capacitor further includes generating, with the resonant tank, a bipolar pulse based on the unipolar pulse. In one embodiment, controlling the output circuitry, during the positive half cycle or the negative half cycle of the input AC voltage waveform, to transfer energy from the capacitor to the first output capacitor and the second output capacitor further includes passing, with the resonant converter, energy derived from a positive portion of the bipolar pulse to the first output capacitor and passing energy, with the resonant converter, energy derived from a negative portion of the bipolar pulse to the second output capacitor.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, AC-DC rectifiers are commonly used in a variety of different applications. For example, with the emergence of cloud computing and high speed network technologies, the demand for high computational power and high energy consumption datacenters has grown. It has become common to use isolated or non-isolated AC-DC rectifiers as power supplies in such datacenters to provide high voltage DC power to a centralized battery and a corresponding DC distribution bus. Many different AC-DC rectifier topologies have been developed to this end; however, these topologies typically have problems with low operating efficiency, low power density, high switching losses, and/or low reliability due to the use of internal electrolytic capacitors.

Accordingly, in at least some embodiments described herein, a non-isolated AC-DC rectifier topology is provided that may limit the use of electrolytic capacitors and may have high reliability, high power density, low switching losses, and high efficiency.

Figure 1:
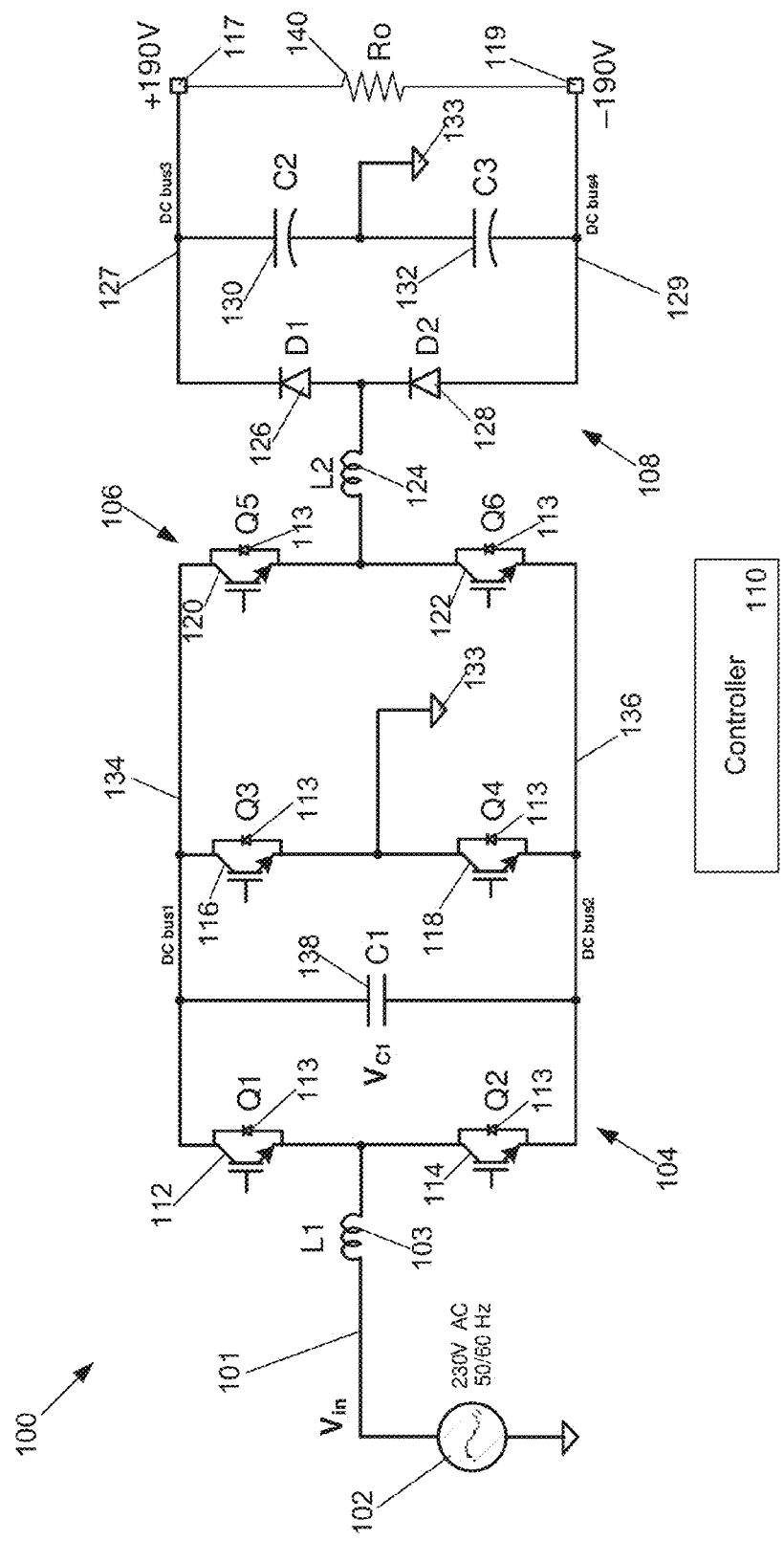
FIG. 1 is a circuit diagram of one embodiment of a non-isolated AC-DC conversion rectifier according to aspects of the current invention.

FIG. 1 is a circuit diagram of one embodiment of a non-isolated AC-DC conversion rectifier 100 according to aspects described herein. The rectifier 100 includes an input 101 configured to be coupled to an AC power source 102, a positive output 117, and a negative output 119. The rectifier 100 also includes a front end full-bridge Power Factor Correction (PFC) converter 104, output circuitry, a controller 110, an output capacitor C2 130, and an output capacitor C3 132. According to one embodiment and as shown in FIG. 1, the output circuitry includes an inverter 106 and a rectifier circuit 108. The front end full-bridge PFC converter 104 includes a first switch (Q1) 112, a second switch (Q2) 114, a third switch (Q3) 116, a fourth switch (Q4) 118, and an inductor L1 103. The inverter 106 includes the first switch (Q1) 112, the second switch (Q2) 114, a fifth switch (Q5) 120, a sixth switch (Q6) 122, and an inductor (L2) 124. The rectifier 108 includes a diode bridge (including a first diode 126 and a second diode 128). In one embodiment, each switch (Q1-Q6) 112-122 is a Metal-Oxide-Semiconductor Field-Effect Transistor (MOSFET); however, in other embodiments, other appropriate types of switches may be utilized. Each switch (Q1-Q6) 112-122 also includes a diode 113 coupled between its drain and source.

The source of the first switch (Q1) 112 is configured to be coupled to the AC power source 102 via inductor L1 103 and is coupled to the drain of the second switch (Q2) 114. The drain of the first switch (Q1) 112 is coupled to the drain of the third switch (Q3) 116 and the drain of the fifth switch (Q5) 120 via a first DC bus 134. The source of the third switch (Q3) 116 and the drain of the fourth switch (Q4) 118 are coupled to ground 133. The source of the fifth switch (Q5) 120 is coupled to the drain of the sixth switch (Q6) 122. The source of the second switch (Q2) 114 is coupled to the source of the fourth switch (Q4) 118 and the source of the sixth switch (Q6) 122 via a second DC bus 136. A first terminal of the inductor L2 124 is coupled to the source of the fifth switch (Q5) 120. A capacitor C1 138 is coupled between the first DC bus 134 and the second DC bus 136.

The anode of diode D1 126 is coupled to a second terminal of the inductor L2 124. The cathode of diode D1 126 is coupled to the positive output 117 via a third DC bus 127. A cathode of the diode D2 128 is coupled to the second terminal of the inductor L2 124. The anode of the diode D2 128 is coupled to the negative output 119 via a fourth DC bus 129. The capacitor C2 130 is coupled between the third DC bus 127 and ground 133. The capacitor C3 132 is coupled between the fourth DC bus 129 and ground 133. A load 140 may be coupled to the positive output 117 and the negative output 119. The controller 110 is coupled to the gate of each switch (Q1-Q6) 112-122. The controller 110 may also be coupled to the input 101, the outputs 117, 119, or to any other location in the rectifier 100 to monitor operating parameters (e.g., voltage or current) of the rectifier 100.

The power source 102 provides input AC power, having a sinusoidal input voltage waveform (Vin), to the front end full-bridge PFC converter 104 and the inverter 106. According to one embodiment, the sinusoidal input voltage waveform has a frequency of 50 Hz or 60 Hz and a magnitude of 230 Vac (±15%); however, in other embodiments, the sinusoidal input voltage waveform may be configured differently.

Figure 2:
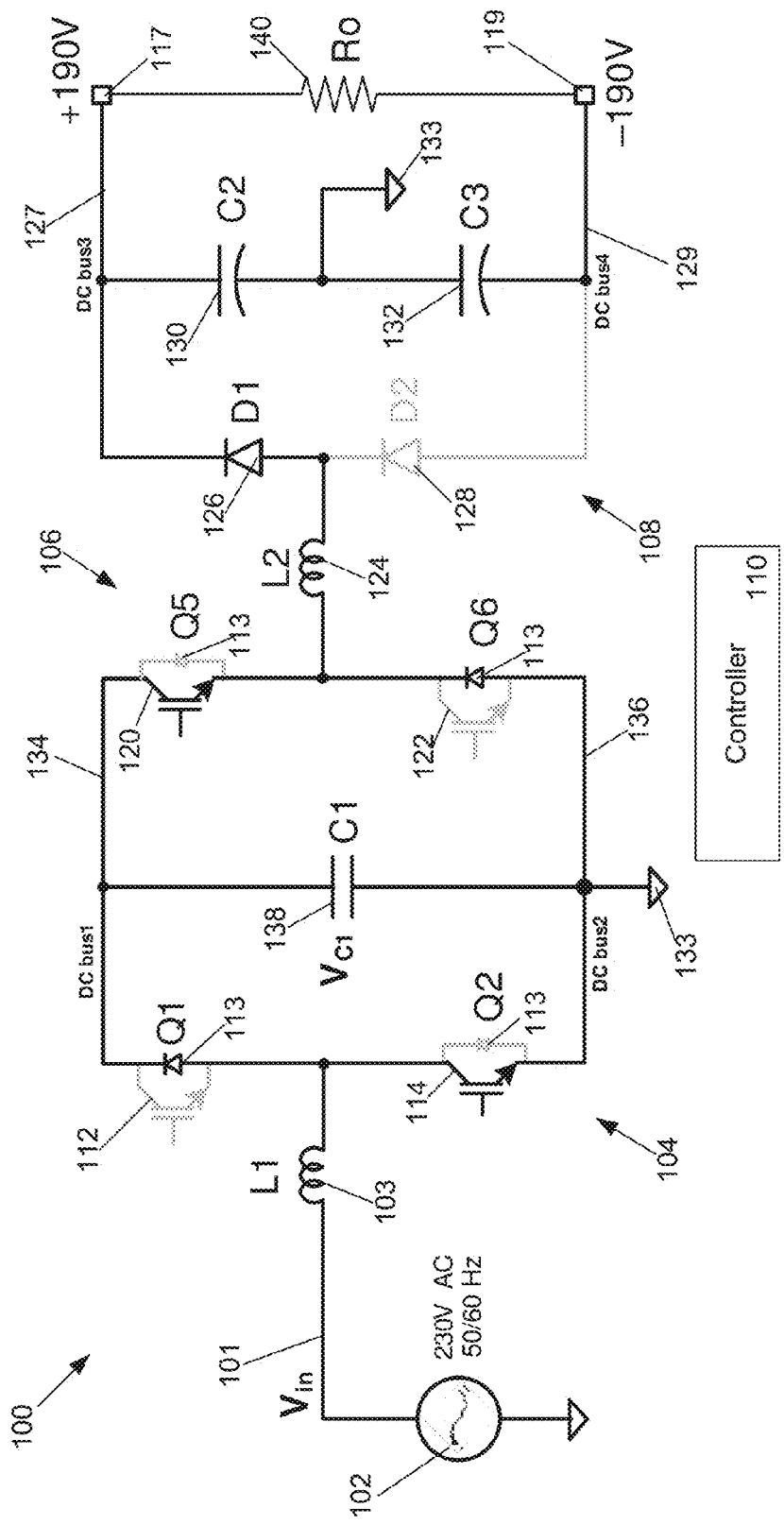
FIG. 2 is a circuit diagram of an effective topology of the non-isolated AC-DC conversion rectifier shown in FIG. 1 during a positive half line cycle according to aspects of the current invention.

The controller 110 monitors the sinusoidal input voltage waveform (Vin). During a positive half cycle of the sinusoidal input voltage waveform (Vin) received at the input 101, the controller 110 maintains the fourth switch (Q4) 118 in a closed condition and maintains the third switch (Q3) 116 in an open condition. As a result, during a positive half cycle of the sinusoidal input voltage waveform (Vin), the second DC bus 136 is coupled to ground 133. FIG. 2 is a circuit diagram illustrating an effective topology of the rectifier 100 during a positive half cycle of Vin where switch Q4 118 is closed and switch Q3 116 is open.

Figure 3:
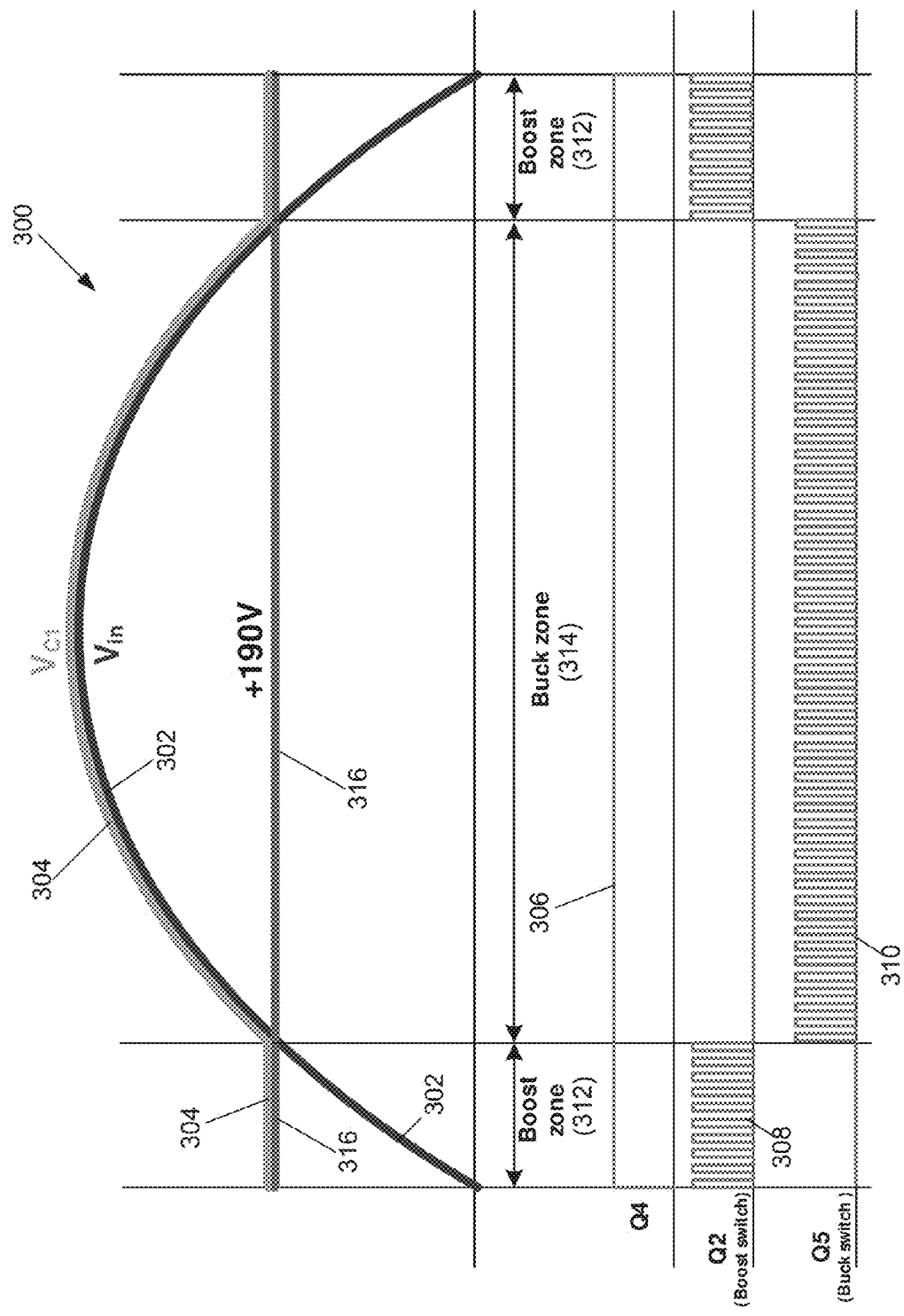
FIG. 3 is a graph illustrating operation of a non-isolated AC-DC conversion rectifier over a positive half line cycle according to aspects of the current invention.

During a positive half cycle of Vin, the controller 110 operates switch Q2 114 as a boost switch and switch Q5 120 as a buck switch to charge capacitor C2 130 and maintain the voltage on the third DC bus 127 at a desired level. FIG. 3 is a graph illustrating operation of the rectifier 100 over a positive half cycle 300 of Vin. The graph includes a first trace 302 representing the sinusoidal input voltage waveform (Vin), a second trace 304 representing the voltage on the capacitor C1 ($V_{C1}$), a third trace 306 representing control signals provided to the gate of switch Q4 118, a fourth trace 308 representing control signals provided to the gate of switch Q2 114, and a fifth trace 310 representing control signals provided to the gates of switch Q5 120.

Over the positive half cycle 300 of Vin 302, the controller 110 provides a high control signal 306 to the gate of switch Q4 118 to maintain switch Q4 118 in a closed condition. Also, based on the instantaneous value of the input voltage Vin 302, the controller 110 operates the rectifier 100 in a boost mode of operation (i.e., a boost zone 312) and a buck mode of operation (i.e., a boost zone 314) to maintain the voltage on the third DC bus 127 (i.e., the voltage on capacitor C2 130) at a desired level. For example, when the controller 110 identifies that the instantaneous value of Vin 302 is less than a desired output voltage 316 (e.g., +190V), the controller 110 operates the rectifier 100 in the boost mode of operation 312.

In the boost mode of operation, the controller 110 provides Pulse Width Modulation (PWM) control signals 308 to switch Q2 114 to operate switch Q2 as a boost switch and the body diode 113 of switch Q1 112 acts as a boost diode. The PWM control signals 308 provided to the gate of switch Q2 114 are configured to drive the opening and closing of the switch Q2 114 such that the voltage ($V_{C1}$) 304 across capacitor C1 138 is maintained just above the desired output voltage 316 (e.g., +190V). The PWM control signals 208 provided to switch Q2 114 are also configured to control the operation of switch Q2 114 such that its average input current is proportional to the input voltage Vin 302 and Power Factor Correction (PFC) is maintained at the input 101.

The controller 110 also provides a control signal 310 to switch Q5 120 to maintain switch Q5 120 in a closed state and a control signal to switch Q6 122 to maintain switch Q6 122 in an open state. When switch Q5 120 is closed, the capacitor C2 130 (i.e., the third DC bus 127) is connected across the capacitor C1 138 via the inductor L2 124, the first diode 126, and switch Q5 120. The capacitor C1 138 cannot absorb or support low frequency current. Therefore, the current through the body diode 113 of switch Q1 112 (in each switching cycle) passes through the switch Q5 120, the inductor L2 124, and the first diode D1 126 to the capacitor C2 130 (i.e., to the third DC bus 127). Accordingly, the voltage on the third DC bus 127 (i.e., on capacitor C2 130) is clamped to the voltage ($V_{C1}$) 304 across the capacitor C1 138 (i.e., +190V).

When the controller 110 identifies that the instantaneous value of Vin 302 is greater than the desired output voltage 316 (e.g., +190V) of the rectifier 100, the controller 110 operates the rectifier 100 in the buck mode of operation 314. In the buck mode of operation, the controller 110 sends a control signal 308 to switch Q2 114 to maintain switch Q2 114 in an open state and a control signal to switch Q1 112 to maintain switch Q1 112 in a closed state. When switch Q1 112 is closed, capacitor C1 138 is coupled to the input 101 via the switch Q1 112 and inductor L1 103 and the voltage ($V_{C1}$) 304 on the capacitor C1 138 follows input voltage Vin 302.

The switch Q5 120, body diode 113 of switch Q6 122, inductor L2 124, and first diode D1 126 form a buck converter to feed the positive output 117 (i.e., the third DC bus 127) from the capacitor C1 138 (i.e., from the power source 102). In the buck mode of operation, the controller 110 sends PWM control signals 310 to the gate of switch Q5 120 to operate the switch Q5 120 as a buck switch and the body diode 113 of switch Q6 122 acts as the freewheeling/clamp diode. The PWM control signals provided to the gate of switch Q5 120 are configured to drive the opening and closing of switch Q5 120 such that the voltage on the third DC bus 127 (i.e., on capacitor C2 130) is maintained at the desired level (e.g., +190V). The PWM control signals provided to the gate of switch Q5 120 are also configured to operate the switch Q5 120 such that, in each switching cycle, the average current through switch Q5 120 is proportional to the input voltage Vin 302 and PFC is maintained at the input 101. The inductor L1 103 and the capacitor C1 138 act as a low pass filter to divert input current harmonics generated by the buck converter into the capacitor C1 138.

By operating the rectifier 100 in both the boost mode of operation 312 and the buck mode of operation 314 over the positive half cycle 300 of Vin 302, the controller 110 can adequately charge capacitor C2 130 to maintain a desired voltage (e.g., +190V) on the third DC bus 127. Also during the positive half cycle 300 of Vin 302, capacitor C3 132 discharges energy, previously stored on the capacitor C3 132 during a negative half cycle of Vin, to provide a desired voltage (e.g., −190V) to the fourth DC bus 129 (i.e., the negative output 119).

Operation of the rectifier 100 during a negative half cycle of Vin is substantially the same as discussed above with regard to the positive half cycle except that operation of some of the elements of the rectifier 100 is reversed. For example, over a negative half cycle of Vin, the controller 110 maintains the fourth switch (Q4) 118 in an open condition and the third switch (Q3) 116 in closed condition, thereby coupling the first DC bus 134 to ground. Over the negative half cycle of Vin, based on the instantaneous value of Vin, the controller 110 operates switch Q1 112 (in combination with the body diode 113 of switch Q2 114) as a boost converter and switch Q6 122 (in combination with the body diode 113 of switch Q5 120, the inductor L2 124, and the second diode 128) as a buck converter to charge capacitor C3 132 and maintain the voltage on the fourth DC bus 129 at a desired level (e.g., −190V). Also during the negative half cycle of Vin 302, capacitor C2 130 discharges energy, previously stored on the capacitor C2 130 during the positive half cycle of Vin, to provide a desired voltage (e.g., +190V) to the third DC bus 127 (i.e., the positive output 117).

As described above, over a positive half cycle of Vin, single switch Q2 114 is operated as a boost switch and single switch Q5 120 is operated as a buck switch to adequately charge capacitor C2 130 to a desired level (e.g., +190V). Similarly, over a negative half cycle of Vin, single switch Q1 112 is operated as a boost switch and single switch Q6 122 is operated as a buck switch to adequately charge capacitor C3 to a desired level (e.g., −190V). By only utilizing a single boost switch and a single buck switch over each half cycle of Vin and alternating the charging of output capacitors C2 and C3, switching losses of the rectifier 100 may be reduced.

For example, during the boost mode of operation in either the positive or negative half cycle of Vin 302, only one switch (i.e., switch Q2 114 or switch Q1 112 respectively) experiences switching loss. In addition, the voltage at which switch Q1 112 or Q2 114 switches is only +190V, further reducing switching losses. Similarly, during the buck mode of operation in either the positive or negative half cycle of Vin 302, only one switch (i.e., switch Q5 120 or switch Q6 122 respectively) experiences switching loss. Further, the voltage at which switch Q5 120 or Q6 122 switches is the instantaneous value of Vin 302, which varies from 190V to 326V. As such, the average switching voltage may be less than 400V. Additionally, due the reduced switching voltages of the single boost and buck switches, large internal electrolytic capacitors which are typically utilized in AC-DC rectifiers may be replaced by smaller capacitors. For example, in one embodiment, capacitor C1 138 is a polypropylene based capacitor; however, in other embodiments, capacitor C1 138 may be any other appropriate type of capacitor.

Figure 4:
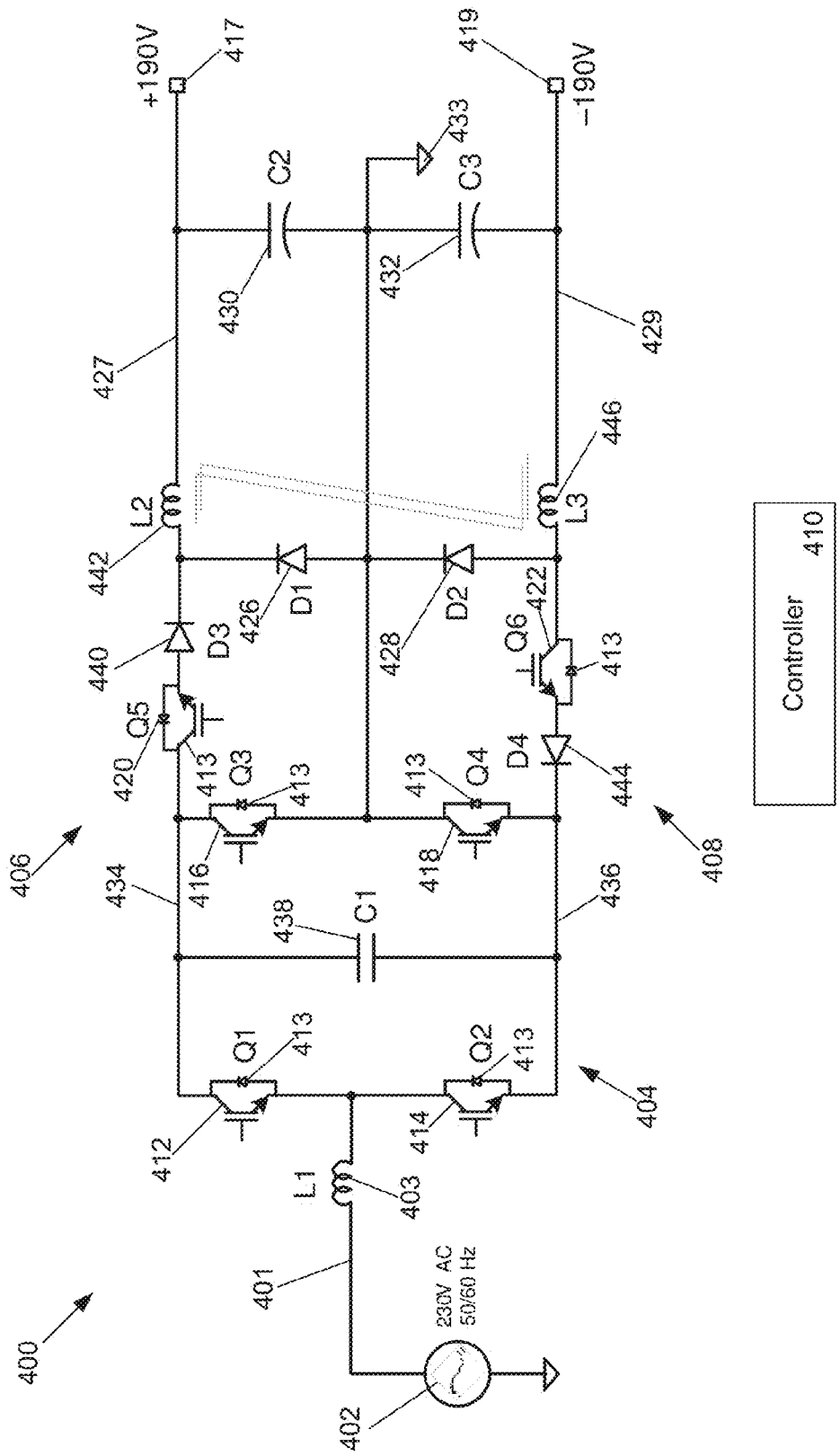
FIG. 4 is a circuit diagram of another embodiment of a non-isolated AC-DC conversion rectifier according to aspects of the current invention.

FIG. 4 is a circuit diagram of another embodiment of a non-isolated AC-DC conversion rectifier 400 according to aspects described herein. The rectifier 400 includes an input 401 configured to be coupled to an AC power source 402, a positive output 417, and a negative output 419. The rectifier 400 also includes a front end full-bridge PFC converter 404, output circuitry, a controller 410, an output capacitor C2 430, and an output capacitor C3 432. According to one embodiment and as shown in FIG. 4, the output circuitry includes a first buck converter 406 and a second buck converter 408. The front end full-bridge PFC converter 404 includes a first switch (Q1) 412, a second switch (Q2) 414, a third switch (Q3) 416, a fourth switch (Q4) 418, and an inductor L1 403. The first buck converter 406 includes a fifth switch (Q5) 420, a diode D3 440, a diode D1 426, and an inductor L2 442. The second buck converter 408 includes a sixth switch (Q6) 422, a diode D4 444, a diode D2 428, and an inductor L3 446. In one embodiment, the inductors L2 442 and L3 446 are realized on a common core; however, in other embodiments, the inductors L2 442 and L3 446 may be configured differently. In one embodiment, each switch (Q1-Q6) 412-422 is MOSFET; however, in other embodiments, other appropriate types of switches may be utilized. Each switch (Q1-Q6) 412-422 also includes a body diode 413 coupled between its drain and source.

The source of the first switch (Q1) 412 is configured to be coupled to the AC power source 402 via inductor L1 403 and is coupled to the drain of the second switch (Q2) 414. The drain of the first switch (Q1) 412 is coupled to the drain of the third switch (Q3) 416 and the drain of the fifth switch (Q5) 420 via a first DC bus 434. The source of the third switch (Q3) 416 and the drain of the fourth switch (Q4) 418 are coupled to ground 433. The source of the fifth switch (Q5) 420 is coupled to the anode of the diode D3 440. The cathode of diode D3 440 is coupled to a first terminal of inductor L2 442. The source of the second switch (Q2) 414 is coupled to the source of the fourth switch (Q4) 418 and the cathode of diode D4 444 via a second DC bus 436. The anode of diode D4 444 is coupled to the source of the sixth switch (Q6) 422. The drain of the sixth switch (Q6) 422 is coupled to a first terminal of inductor L3 446. A capacitor C1 438 is coupled between the first DC bus 434 and the second DC bus 436.

Diode D1 426 is coupled between ground 433 and the first terminal of the inductor L2 442. Diode D2 428 is coupled between the first terminal of the inductor L3 446 and ground 433. The second terminal of inductor L2 442 is coupled to the positive output 417 via a third DC bus 427. The second terminal of inductor L3 446 is coupled to the negative output 419 via a fourth DC bus 429. The capacitor C2 430 is coupled between the third DC bus 427 and ground 433. The capacitor C3 432 is coupled between the fourth DC bus 429 and ground 433. A load may be coupled to the positive output 417 and the negative output 419. The controller 410 is coupled to the gate of each switch (Q1-Q6) 412-422. The controller 110 may also be coupled to the input 401, the outputs 417, 419, or to any other location in the rectifier 400 to monitor operating parameters (e.g., voltage or current) of the rectifier 400.

Operation of the rectifier 400 is similar to that discussed above with regard to the rectifier 100 shown in FIGS. 1 and 2. The power source 402 provides input AC power, having a sinusoidal input voltage waveform (Vin), to the front end full-bridge PFC converter 404 and the buck converters 406, 408. According to one embodiment, the sinusoidal input voltage waveform has a frequency of 50 Hz or 60 Hz and a magnitude of 230 Vac (±15%); however, in other embodiments, the sinusoidal input voltage waveform may be configured differently.

Figure 5:
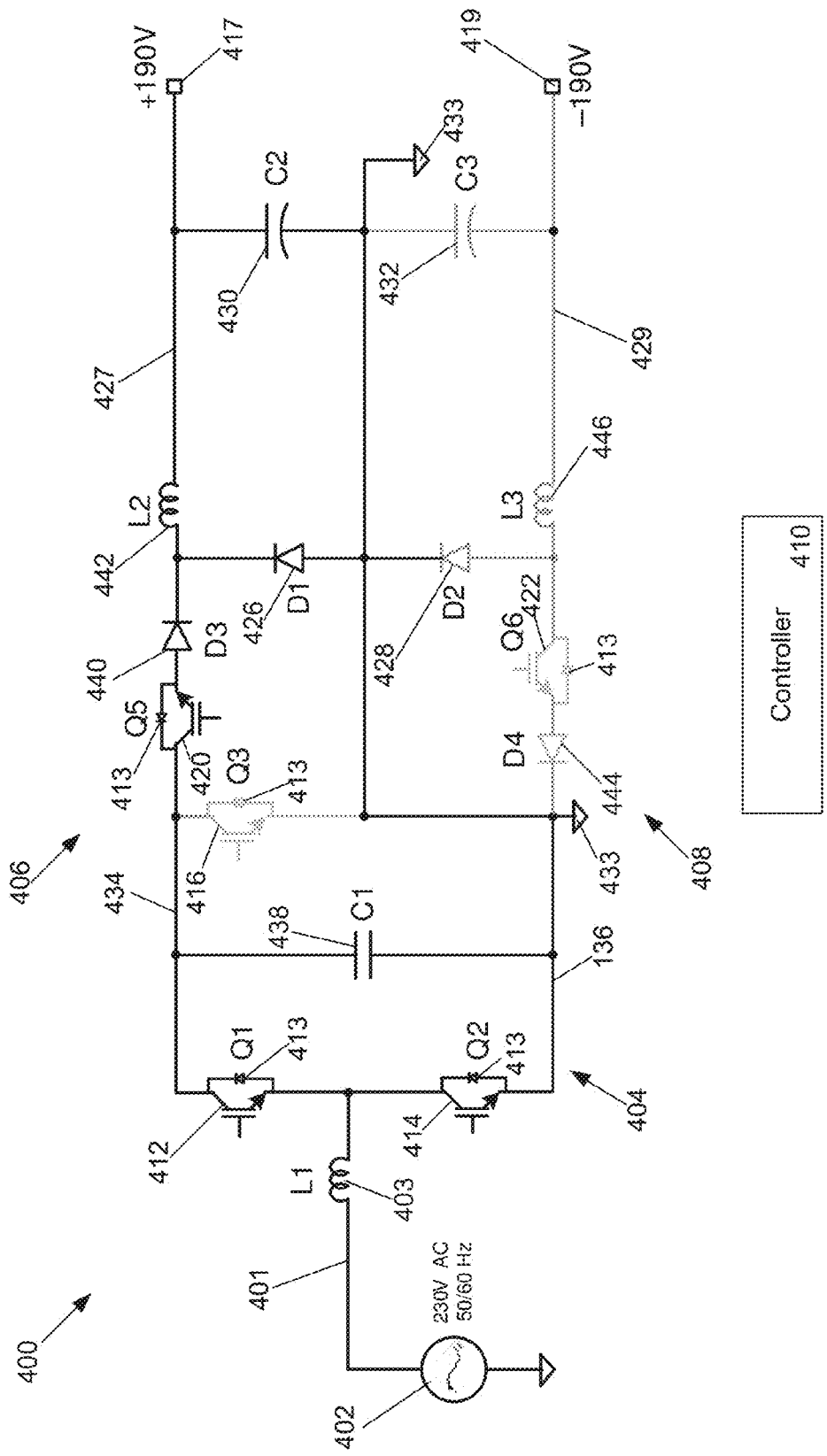
FIG. 5 is a circuit diagram of an effective topology of the non-isolated AC-DC conversion rectifier shown in FIG. 4 during a positive half line cycle according to aspects of the current invention.

The controller 410 monitors the sinusoidal input voltage waveform (Vin). During a positive half cycle of the sinusoidal input voltage waveform (Vin) received at the input 401, the controller 410 maintains the fourth switch (Q4) 418 in a closed condition and maintains the third switch (Q3) 416 in an open condition. As a result, during a positive half cycle of the sinusoidal input voltage waveform (Vin), the second DC bus 436 is coupled to ground 433. FIG. 5 is a circuit diagram illustrating an effective topology of the rectifier 400 during a positive half cycle of Vin where switch Q4 418 is closed and switch Q3 416 is open.

During a positive half cycle of Vin, the controller 410 operates switch Q2 414 as a boost switch and switch Q5 420 as a buck switch to charge capacitor C2 430 and maintain the voltage on the third DC bus 427 at a desired level (e.g., +190V). For example, when the controller 410 identifies that the instantaneous value of Vin is less than a desired output voltage (e.g., +190V), the controller 410 operates the rectifier 400 in the boost mode of operation 312. In the boost mode of operation, the controller 410 provides PWM control signals to switch Q2 414 to operate switch Q2 414 as a boost switch and the body diode 413 of switch Q1 412 acts as a boost diode. The PWM control signals provided to the gate of switch Q2 414 are configured to drive the opening and closing of the switch Q2 414 such that the voltage across capacitor C1 438 is maintained just above the desired output voltage (e.g., +190V). The PWM control signals provided to switch Q2 414 are also configured to control the operation of switch Q2 414 such that its average input current is proportional to the input voltage Vin and PFC is maintained at the input 401.

In the boost mode of operation, the controller 110 also provides a control signal to switch Q5 420 to maintain switch Q5 420 in a closed state. When switch Q5 420 is closed, the capacitor C2 430 (i.e., the third DC bus 427) is connected across the capacitor C1 338 via the inductor L2 424, the diode D3 440, and the switch Q5 420. Accordingly, the voltage on the third DC bus 427 (i.e., on capacitor C2 430) is clamped to the voltage across the capacitor C1 438 (i.e., +190V).

When the controller 410 identifies that the instantaneous value of Vin is greater than the desired output voltage (e.g., +190V) of the rectifier 400, the controller 410 operates the rectifier 400 in the buck mode of operation. In the buck mode of operation, the controller 410 sends a control signal to switch Q2 414 to maintain switch Q2 114 in an open state and a control signal to switch Q1 412 to maintain switch Q1 412 in a closed state. When switch Q1 412 is closed, capacitor C1 438 is coupled to the input 401 via the switch Q1 412 and inductor L1 403 and the voltage on the capacitor C1 438 follows the input voltage Vin.

The switch Q5 420, inductor L2 442, and diode D1 426 form a buck converter to feed the positive output 417 (i.e., the third DC bus 427) from the capacitor C1 438 (i.e., from the power source 402). In the buck mode of operation, the controller 410 sends PWM control signals to the gate of switch Q5 420 to operate the switch Q5 420 as a buck switch and the diode D1 426 acts as the freewheeling/clamp diode. The PWM control signals provided to the gate of switch Q5 420 are configured to drive the opening and closing of switch Q5 420 such that the voltage on the third DC bus 427 (i.e., on capacitor C2 430) is maintained at the desired level (e.g., +190V). The PWM control signals provided to the gate of switch Q5 420 are also configured to operate the switch Q5 420 such that, in each switching cycle, the average current through switch Q5 420 is proportional to the input voltage and PFC is maintained at the input 401. Diodes D3 440 and D4 444 prevent a short circuit from occurring between the positive 417 and negative 419 outputs due to the turning on of switches Q3 416 and Q4 18.

By operating the rectifier 400 in both the boost mode of operation and the buck mode of operation over the positive half cycle of Vin, the controller 110 can adequately charge capacitor C2 430 to maintain a desired voltage (e.g., +190V) on the third DC bus 427. Also during the positive half cycle of Vin 302, capacitor C3 432 discharges energy, previously stored on the capacitor C3 432 during a negative half cycle of Vin, to provide a desired voltage (e.g., −190V) to the fourth DC bus 429 (i.e., the negative output 419).

Operation of the rectifier 400 during a negative half cycle of Vin is substantially the same as discussed above with regard to the positive half cycle except that operation of some of the elements of the rectifier 400 is reversed. For example, over a negative half cycle of Vin, the controller 410 maintains the fourth switch (Q4) 418 in an open condition and the third switch (Q3) 416 in a closed condition (e.g., shown in FIG. 5), thereby coupling the first DC bus 434 to ground 433. Over the negative half cycle of Vin, based on the instantaneous value of Bin, the controller 410 operates switch Q1 412 (in combination with the body diode 413 of switch Q2 414) as a boost converter and switch Q6 422 (in combination with the inductor L3 446 and the diode D2 428) as a buck converter to charge capacitor C3 432 and maintain the voltage on the fourth DC bus 429 at a desired level (e.g., −190V). Also during the negative half cycle of Vin 302, capacitor C2 430 discharges energy, previously stored on the capacitor C2 430 during the positive half cycle of Vin, to provide a desired voltage (e.g., +190V) to the third DC bus 427 (i.e., the positive output 417).

As described above, over a positive half cycle of Vin, single switch Q2 414 is operated as a boost switch and single switch Q5 420 is operated as a buck switch to adequately charge capacitor C2 430 to a desired level (e.g., +190V). Similarly, over a negative half cycle of Vin, single switch Q1 412 is operated as a boost switch and single switch Q6 422 is operated as a buck switch to adequately charge capacitor C3 432 to a desired level (e.g., −190V). By only utilizing a single boost switch and a single buck switch over each half cycle of Vin and alternating the charging of output capacitors C2 and C3, switching losses of the rectifier 100 may be reduced.

For example, during the boost mode of operation in either the positive or negative half cycle of Vin, only one switch (i.e., switch Q2 414 or switch Q1 412 respectively) experiences switching loss. In addition, the voltage at which switch Q1 412 or Q2 414 switches is only +190V, further reducing switching losses. Similarly, during the buck mode of operation in either the positive or negative half cycle of Vin, only one switch (i.e., switch Q5 420 or switch Q6 422 respectively) experiences switching loss. Further, the voltage at which switch Q5 420 or switch Q6 422 switches is the instantaneous value of Vin, which varies from 190V to 326V. As such, the average switching voltage may be less than 400V. Additionally, due the reduced switching voltages of the single boost and buck switches, large internal electrolytic capacitors which are typically utilized in AC-DC rectifiers may be replaced by smaller capacitors. For example, in one embodiment, capacitor C1 438 is a polypropylene based capacitor; however, in other embodiments, capacitor C1 438 may be any other appropriate type of capacitor.

The conduction losses of rectifier 400 may also be less than that of the rectifier shown in FIGS. 1 and 2. For example, during the buck converter freewheeling interval of rectifier 100, the freewheeling path is from ground 133 through switch Q4 118, through the body diode 113 of switch Q6 122, and through diode D1 126. Alternatively, the freewheeling path of the rectifier 400 is only from ground 433 through diode D1 426. By only utilizing one semiconductor device in the freewheeling path, the conduction losses of the rectifier 400 may be less than that of rectifier 100.

Figure 6:
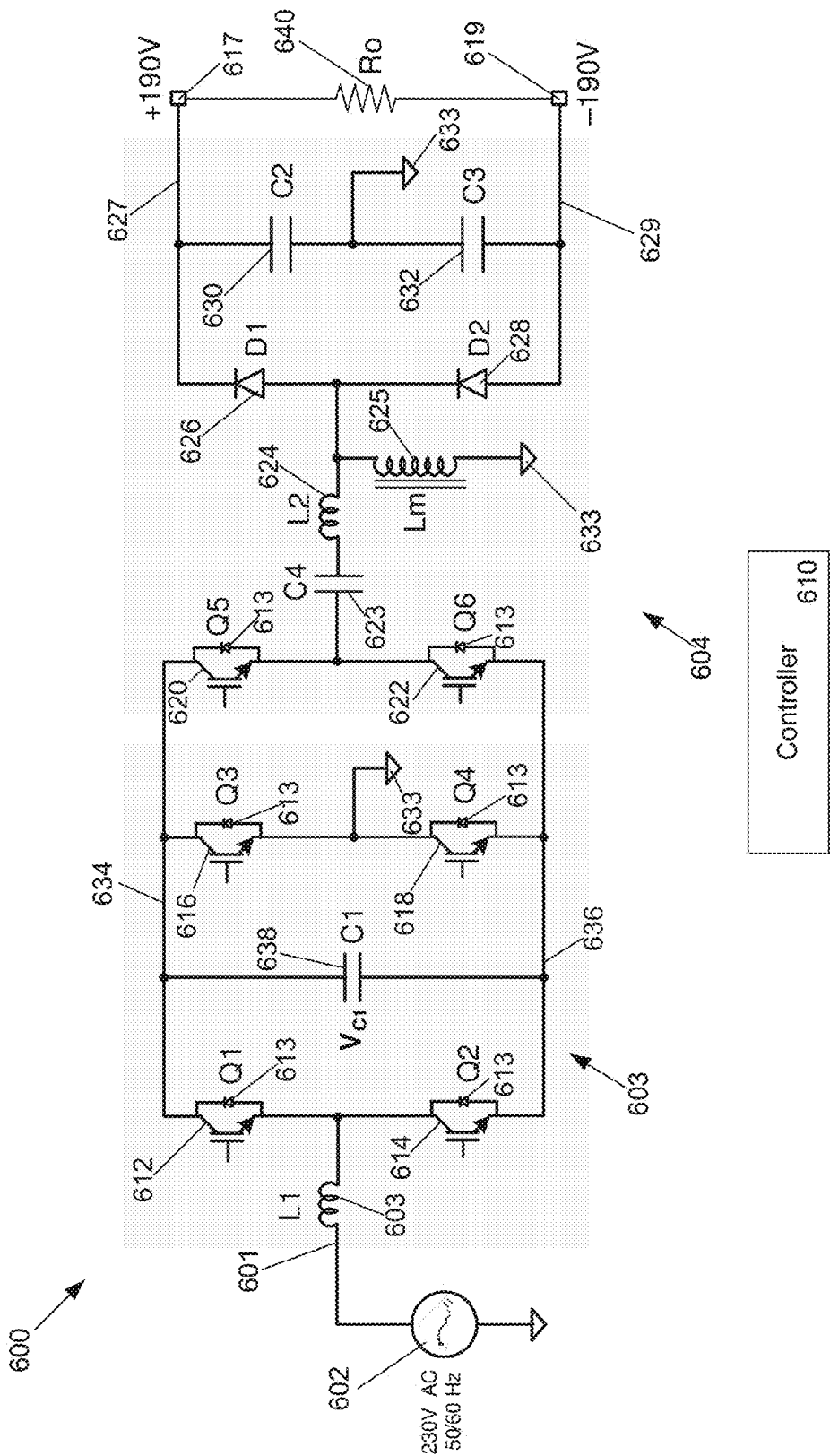
FIG. 6 is a circuit diagram of another embodiment of a non-isolated AC-DC conversion rectifier according to aspects of the current invention.

FIG. 6 is a circuit diagram of another embodiment of a non-isolated AC-DC conversion rectifier 600 according to aspects of the current invention. The rectifier 600 includes an input 601 configured to be coupled to an AC power source 602, a front end full-bridge PFC converter 603, output circuitry, a positive output 617, a negative output 619, a controller 610, an output capacitor C2 630, and an output capacitor C3 632. According to one embodiment and as shown in FIG. 6, the output circuitry includes a half-bridge LLC resonant DC-DC converter 604.

The front end full-bridge PFC converter 603 includes a first switch (Q1) 612, a second switch (Q2) 614, a third switch (Q3) 616, a fourth switch (Q4) 618, and an inductor L1 603. The resonant DC-DC converter 604 includes a fifth switch (Q5) 620, a sixth switch (Q6) 622, a resonant tank circuit (including a capacitor C4 623, an inductor L2 624, and an inductor Lm 625), a diode D1 626, and a diode D2 628. In one embodiment, each switch (Q1-Q6) 612-622 is MOSFET; however, in other embodiments, other appropriate types of switches may be utilized. Each switch (Q1-Q6) 612-622 also includes a body diode 613 coupled between its drain and source.

The source of the first switch (Q1) 612 is configured to be coupled to the AC power source 602 via inductor L1 603 and is coupled to the drain of the second switch (Q2) 614. The drain of the first switch (Q1) 612 is coupled to the drain of the third switch (Q3) 616 and the drain of the fifth switch (Q5) 620 via a first DC bus 634. The source of the third switch (Q3) 616 and the drain of the fourth switch (Q4) 618 are coupled to ground 633. The source of the fifth switch (Q5) 620 is coupled to the drain of the sixth switch (Q6) 622. The source of the second switch (Q2) 614 is coupled to the source of the fourth switch (Q4) 618 and the source of the sixth switch (Q6) 622 via a second DC bus 636. A first terminal of capacitor C4 623 is coupled to the source of the fifth switch (Q5) 620. A second terminal of capacitor C4 623 is coupled to a first terminal of the inductor L2 624. A second terminal of the inductor L2 624 is coupled to the anode of the diode D1 626. A first terminal of the inductor Lm 625 is coupled between the second terminal of the inductor 624 and ground 633. A capacitor C1 638 is coupled between the first DC bus 634 and the second DC bus 636.

The cathode of the diode D1 626 is coupled to the positive output 617 via a third DC bus 627. A cathode of diode D2 628 is coupled to the second terminal of the inductor L2 624. The anode of diode D2 628 is coupled to the negative output 619 via a fourth DC bus 629. The capacitor C2 630 is coupled between the third DC bus 627 and ground 633. The capacitor C3 632 is coupled between the fourth DC bus 629 and ground 633. A load 640 may be coupled to the positive output 617 and the negative output 619. The controller 610 is coupled to the gate of each switch (Q1-Q6) 612-622. The controller 610 may also be coupled to the input 601, the outputs 617, 619, or to any other location in the rectifier 600 to monitor operating parameters (e.g., voltage or current) of the rectifier 600.

The power source 602 provides input AC power, having a sinusoidal input voltage waveform (Vin), to the front end full-bridge PFC converter 603 and the resonant converter 604. According to one embodiment, the sinusoidal input voltage waveform has a frequency of 50 Hz or 60 Hz and a magnitude of 230 Vac (±15%); however, in other embodiments, the sinusoidal input voltage waveform may be configured differently.

Figure 7:
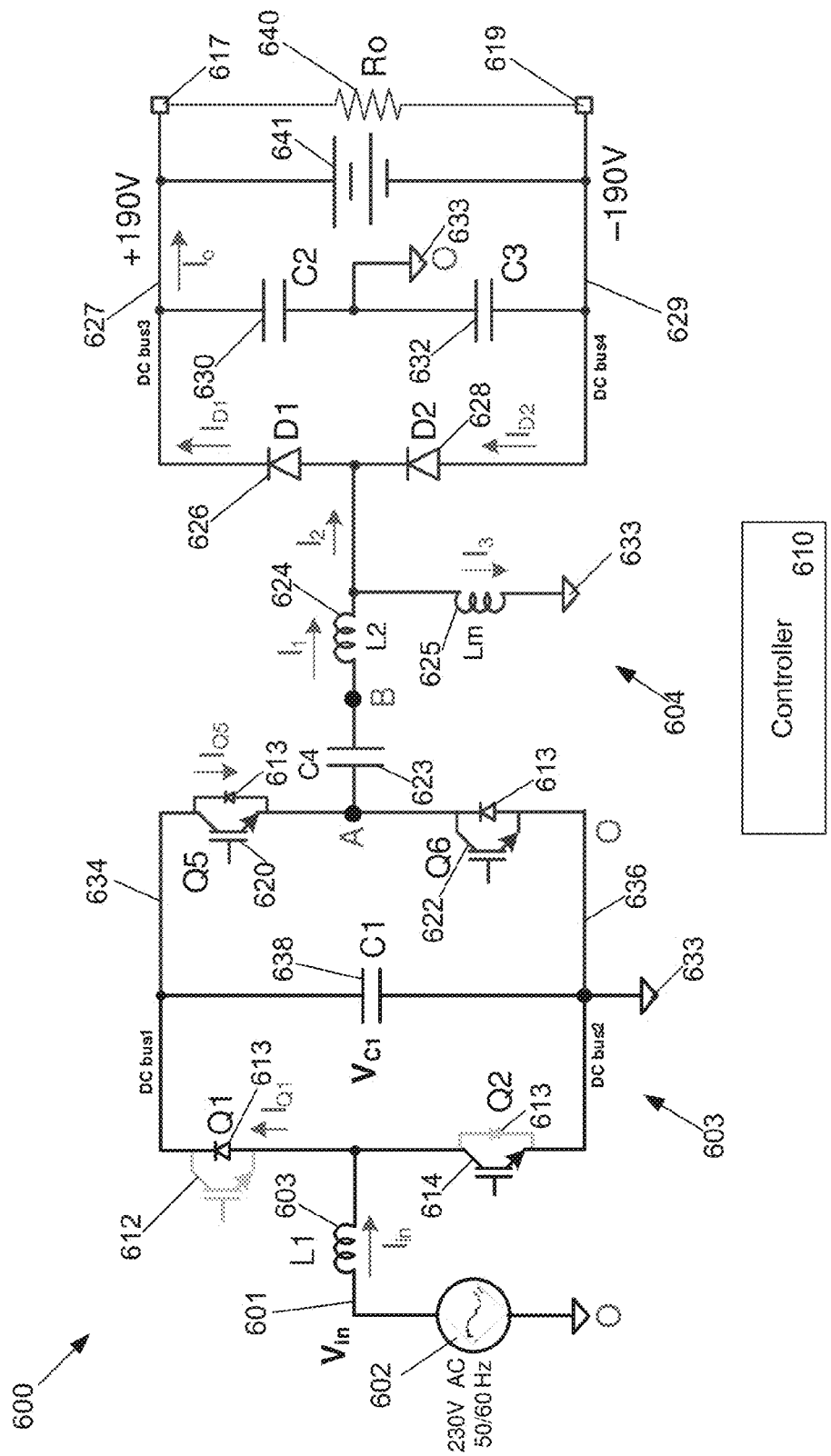
FIG. 7 is a circuit diagram of an effective topology of the non-isolated AC-DC conversion rectifier shown in FIG. 6 during a positive half line cycle according to aspects of the current invention.

The controller 610 monitors the sinusoidal input voltage waveform (Vin). During a positive half cycle of the sinusoidal input voltage waveform (Vin) received at the input 601, the controller 610 maintains the fourth switch (Q4) 618 in a closed condition and maintains the third switch (Q3) 416 in an open condition, thereby coupling the second DC bus 636 to ground 633. For example, FIG. 7 is a circuit diagram of an effective topology of the non-isolated AC-DC conversion rectifier 600 shown in FIG. 6 during a positive half line cycle according to aspects of the current invention. During a negative half cycle of Vin received at the input 601, the controller 610 maintains the third switch (Q3) 616 in a closed condition and maintains the fourth switch (Q4) 618 in an open condition, thereby coupling the first DC bus 634 to ground 633.

The controller 610 operates switch Q2 614 (in combination with the body diode 613 of switch Q1 612 and the inductor L1 603) as a boost converter. The controller 610 sends PWM control signals to the gate of switch Q2 614 to regulate the voltage ($V_{C1}$) across capacitor C1 638 to around 370V. The controller 610 also operates the switch Q2 614 to provide PFC at the input 601.

Figure 8:
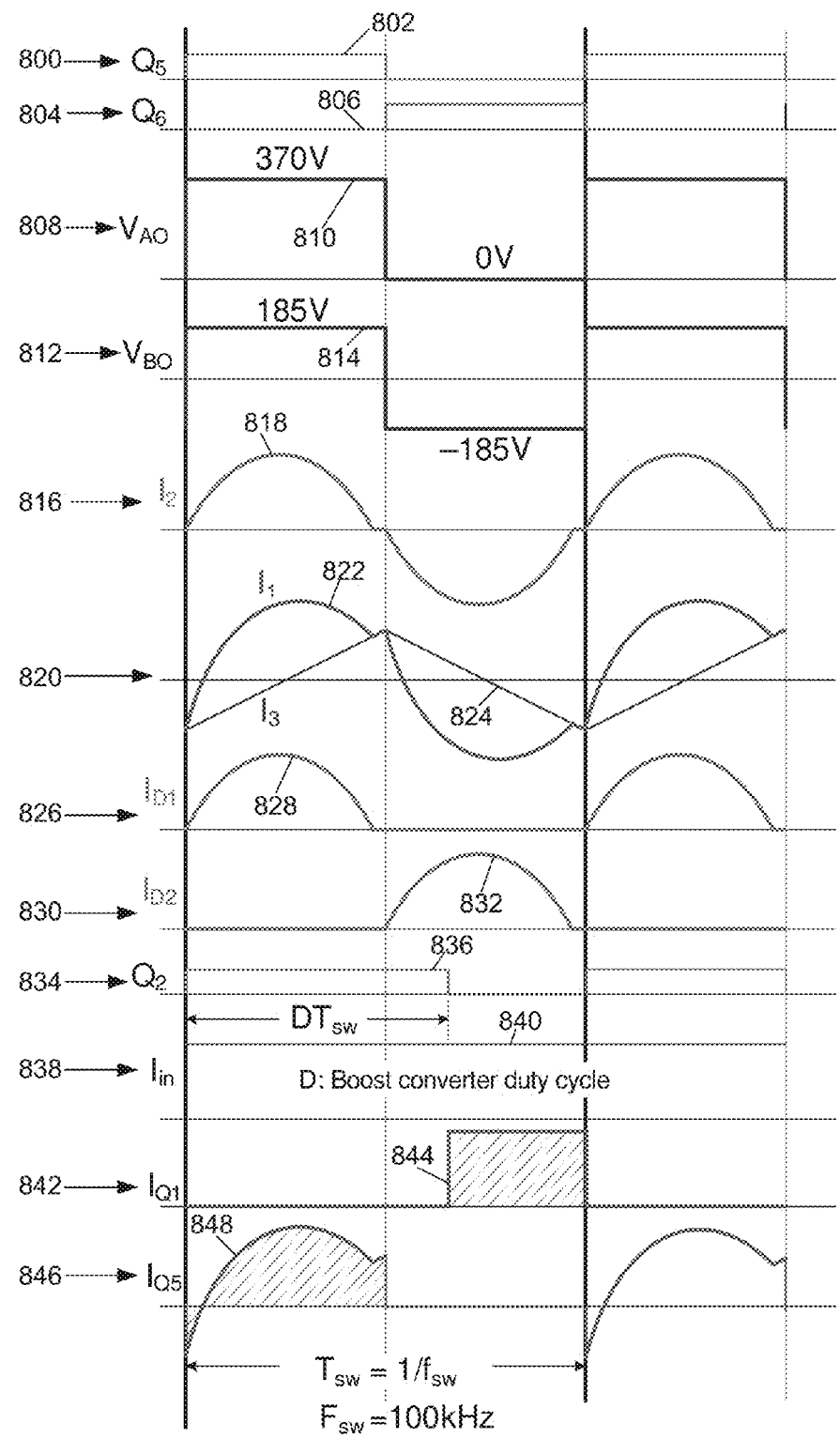
FIG. 8 is a diagram including graphs illustrating the operation of the non-isolated AC-DC conversion rectifier shown in FIG. 6 according to aspects of the current invention.

Switch Q5 620, switch Q6 622, the resonant tank (i.e., inductor L2 624, inductor Lm 625, and capacitor C4 623), diode D1 626, and diode D2 628 form the half-bridge LLC resonant DC-DC converter 604 that is configured to transfer energy from the capacitor C1 638 to the capacitor C2 630 and to the capacitor C3 632. FIG. 8 is a diagram including graphs illustrating the operation of the rectifier 600 over a positive half cycle of Vin. A first graph 800 includes a trace 802 representing a control signal provided by the controller 610 to the gate of switch Q5 620. A second graph 804 includes a trace 806 representing a control signal provided by the controller 610 to the gate of switch Q6 622. A third graph 808 includes a trace 810 representing the voltage ($V_{AO}$) between node A and ground 633. A fourth graph 812 includes a trace 812 representing the voltage ($V_{BO}$) between node B and ground 633. A fifth graph 816 includes a trace 818 representing the current ($I_2$) output by the resonant tank circuit. A sixth graph 820 includes a first trace 822 representing the current ($I_1$) through inductor L2 624 and a second trace 824 representing the current ($I_3$) through inductor Lm 625. A seventh graph 826 includes a trace 828 representing the current ($I_{D1}$) through diode D1 626. An eighth graph 830 includes a trace 832 representing the current ($I_{D2}$) through diode D2 628. A ninth graph 834 includes a trace 836 representing a control signal provided by the controller 610 to the gate of switch Q2 614. A tenth graph 838 includes a trace 840 representing the input current ($I_{in}$). An eleventh graph 842 includes a trace 844 representing the current ($I_{Q1}$) through the body diode 613 of switch Q1 612. A twelfth graph 846 includes a trace 848 representing the current ($I_{Q5}$) through the switch Q5 620.

In at least one embodiment, the controller 610 operates switches Q5 620 and Q6 622, with nearly 50% duty cycle complementary PWM signals, to provide a unipolar voltage pulse ($V_{AO}$) 810 of 370V to the resonant tank (i.e., to capacitor C4 623). The capacitor C4 623 acts as a DC blocking capacitor and as a result, a bipolar voltage pulse ($V_{BO}$) 814 of ±185V is applied to the inductor L2 624. The resonant tank outputs a resulting current $I_2$ 818 and as shown in FIG. 8, energy derived from a positive portion of the bipolar pulse 814 is provided to the capacitor C2 630 via diode D1 626 (as current $I_{D1}$ 828) and energy from and energy derived from a negative portion of the bipolar pulse 814 is provided to the capacitor C3 632 via diode D2 628 (as current $I_{D2}$ 832).

As also shown in FIG. 8 (i.e., in graphs 808, 812 and 846), switches Q5 620 and Q6 622 are turned on with zero voltage switching and the current through each switch 620, 622 is negative (i.e., the body diode 613 is conducting) when the switch 620, 622 is turned on. Further, the switches 620, 622 are turned on after the diode currents $I_{D1}$ 828 and $I_{D2}$ 832 drop down to zero. Hence, the switching losses of switches Q5 620 and Q6 622 are reduced and the switches Q5 620 and Q6 622 do not incur additional switching losses due to diode reverse recovery.

In each switching cycle (e.g., at 100 kHz), the positive current pulse of current $I_2$ 816 charges the capacitor C2 630, while the negative current pulse of current $I_2$ 816 charges the capacitor C3 632. In this way, both capacitors C2 630 and C3 632 are charged alternatively in every switching cycle throughout the line cycle. As such, capacitors C2 630 and C3 632 may need to provide less hold up time (e.g., as compared to the embodiments shown in FIGS. 1 and 4) and may be implemented using low-valued (e.g., less than 10 μF) polypropylene capacitors.

As further shown in FIGS. 7-8 the average current of $I_{Q1}$ 842 equals the average current of $I_{Q5}$ 846 over each switching cycle. The capacitor C1 638 does not carry any low-frequency current and only carries the switching-frequency ripple current. Hence, the capacitor C1 638 does not require a significant hold up time and can have a relatively low capacitance. For example, in one embodiment, the value of C1 638 is between 2 uF and 20 uF; however, in other embodiments, the capacitance of C1 638 may be some other appropriate value.

Due to the low value of capacitors C2 630 and C3 632, the capacitors C2 630 and C3 632 do not absorb any low-frequency current components and only absorb high-frequency current components. Accordingly, the output current $I_o$ will have low frequency current ripple superimposed on the DC current component. Where the rectifier 600 is one of three single-phase modules in a rectifier system coupled to the load 640, the low-frequency current components at the output side of each module cancel each other, resulting in the DC component of the current going to the load 640 and a battery 641 coupled to the output 617, 619.

The expression of the duty cycle for switch Q2 614 is given by:

$$D_{PFC} = 1 - \frac{V_{in}}{V_{C1}}.$$

The average input voltage ($V_{in}$) and input current ($I_n$) are expressed by:

$$V_{in}V_m = V_m \sin \omega t$$

$$I_{in} = I_m \sin \omega t,$$

where $V_m$ and $I_m$ are their respective amplitudes.

The average of current $I_{Q1}$ 842 has a DC and a second harmonic component as given by:

$$I_{Q1} = (1 - D_{PFC})I_{in} =$$

$$\left(\frac{v_{in}}{V_{C1}}\right)I_{in} = \left(\frac{V_m I_m}{2V_{C1}}\right)(1 - \cos 2\omega t) = \left(\frac{V_m I_m}{2V_{C1}}\right) - \left(\frac{V_m I_m}{2V_{C1}}\right)\cos 2\omega t.$$

As the capacitor C1 638 is relatively low valued, it cannot absorb the second harmonic current. As such, the entire current $I_{Q1}$ 842 passes through the switch Q5 620 as current $I_{Q5}$ 846 in each switching cycle. The LLC DC-DC resonant converter 604 should draw the same current from the capacitor C1 638 in each switching cycle. Further, the average of current $I_{Q5}$ 846 is proportional to the output current $I_o$, as the capacitors C2 630 and C3 632, being relatively low valued, cannot absorb the second harmonic current. Hence, the output current $I_o$ is also proportional the current $I_{Q1}$ 842.

The LLC DC-DC resonant converter 604 can be forced to draw a time varying current from its input in a variety of ways. For example, it can draw a time varying current from its input by continuously changing the PWM duty cycle, by keeping the switching frequency fixed at a particular value, by varying its input voltage (i.e., by varying $V_{C1}$), and by a combination of the above methods.

Figure 9:
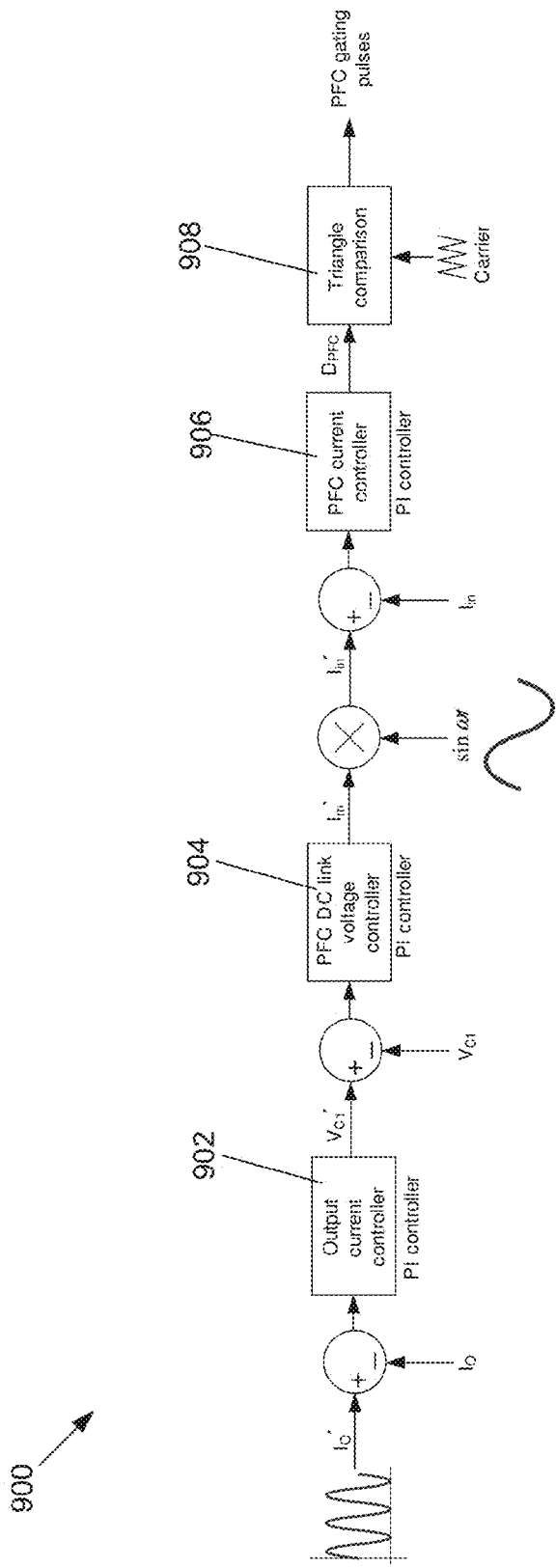
FIG. 9 is a flow chart showing a control strategy for the non-isolated AC-DC conversion rectifier shown in FIG. 6 according to aspects of the current invention.

FIG. 9 is a flow chart 900 showing one embodiment of a control strategy for the non-isolated AC-DC conversion rectifier 600 shown in FIG. 6. An output current reference (V) proportional to the current $I_{Q1}$ 842 (where $I_{Q1}$ 842 including a DC current component superimposed with a second harmonic current component as discussed above) is compared to the output current $I_o$. An output current controller 902 processes the resulting output current error. In one embodiment, the output current controller 902 is a Proportional-Integral (PI) controller; however, in other embodiments, a different type of controller may be utilized. The output of the controller 902 sets the DC link voltage reference ($V_{C1}^*$). The DC link voltage reference ($V_{C1}^*$) is compared to the voltage across capacitor C1 638 ($V_{C1}$). A PFC DC link voltage controller 904 processes the resulting error and outputs an input current amplitude reference ($I_m^*$). In one embodiment, the PFC DC link voltage controller 904 is a Proportional-Integral (PI) controller; however, in other embodiments, a different type of controller may be utilized.

The input current amplitude reference ($I_m^*$) is multiplied by sin ωt (e.g., as discussed above) and the resulting input current reference ($I_{in}^*$) is compared to the input current ($I_{in}$). Based on the resulting error, a PFC current controller 906 outputs a modulating signal ($D_{PFC}$). In one embodiment, the PFC current controller 906 is a Proportional-Integral (PI) controller;

however, in other embodiments, a different type of controller may be utilized. The modulating signal ($D_{PFC}$) is provided to a triangle comparison module 908 which compares the modulating signal ($D_{PFC}$) to a saw tooth carrier wave. The comparison performed by the triangle comparison module 908 results in PFC gating pulses which are provided to the switches of the rectifier 600 to maintain PFC operation at the input and to regulate the voltage ($V_{C1}$) across the capacitor 638 at the desired reference ($V_{C1}^*$).

According to at least one embodiment and unlike traditional PFC, slight variations in the voltage ($V_{C1}$) across the capacitor 638 may be required to channel the low-frequency current component at the output of the PFC converter 603 through the LLC DC-DC resonant converter 604 to the outputs 617, 619.

Figure 10:
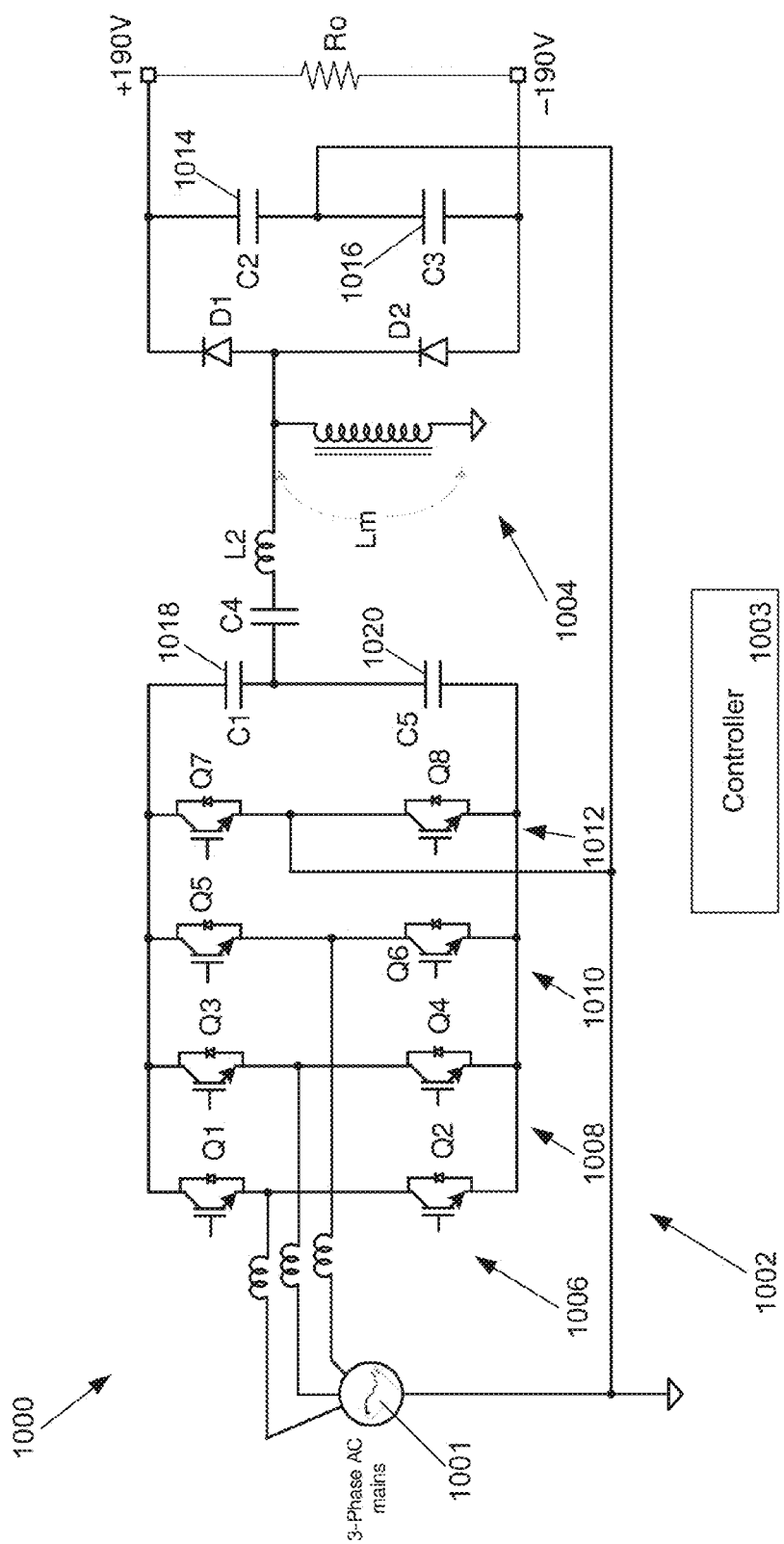
FIG. 10 is a circuit diagram of another embodiment of a non-isolated AC-DC conversion rectifier according to aspects of the current invention.

FIG. 10 is a circuit diagram of another embodiment of a non-isolated AC-DC conversion rectifier 1000 according to aspects of the current invention. The rectifier includes a three-phase, four-leg, four-wire rectifier 1002 followed by an LLC resonant DC-DC converter 1004. The first three legs (1006, 1008, 1010) of the rectifier 1000 are each coupled TO a three-phase mains AC power source 1001 and configured to receive and operate on a different phase of three-phase power provided by the power source 1001 to the rectifier 1000. A fourth leg 1012 of the rectifier 1000 serves as a neutral leg as well as an input leg of the LLC resonant DC-DC converter 1004.

Each of the first three legs (1006, 1008, 1010) of the rectifier operates substantially the same as the rectifier 600 describe above with regard to FIG. 6. For example, each leg 1006, 1008, 1010 operates on an input AC voltage waveform to maintain sinusoidal current at unity power factor from the mains power source 1001 and to hold the DC link voltage at a desired level. The fourth leg 1012 has multiple functions. It acts as the neutral leg for the front end PFC rectifier 1002, ensures zero neutral current under a balanced input voltage condition, and acts as the input leg for the DC-DC converter 1004. According to one embodiment, the fourth leg 1012 is operated with 50% duty cycle PWM.

According to one embodiment, because the output capacitors C2 1014 and C3 1016 are charged alternatively in every switching cycle throughout the line cycle (e.g., as discussed above with regard to FIG. 6), the capacitors C2 1014 and C3 1016 are low-valued (e.g., less than 10 μF) polypropylene capacitors. However, in other embodiments, the output capacitors C2 1014 and C3 1016 may be other types of capacitors. According to one embodiment, the capacitors C1 1018 and C5 1020 are also polypropylene capacitors; however, in other embodiments, the capacitors C1 1018 and C5 1020 are other types of capacitors.

Figure 11:
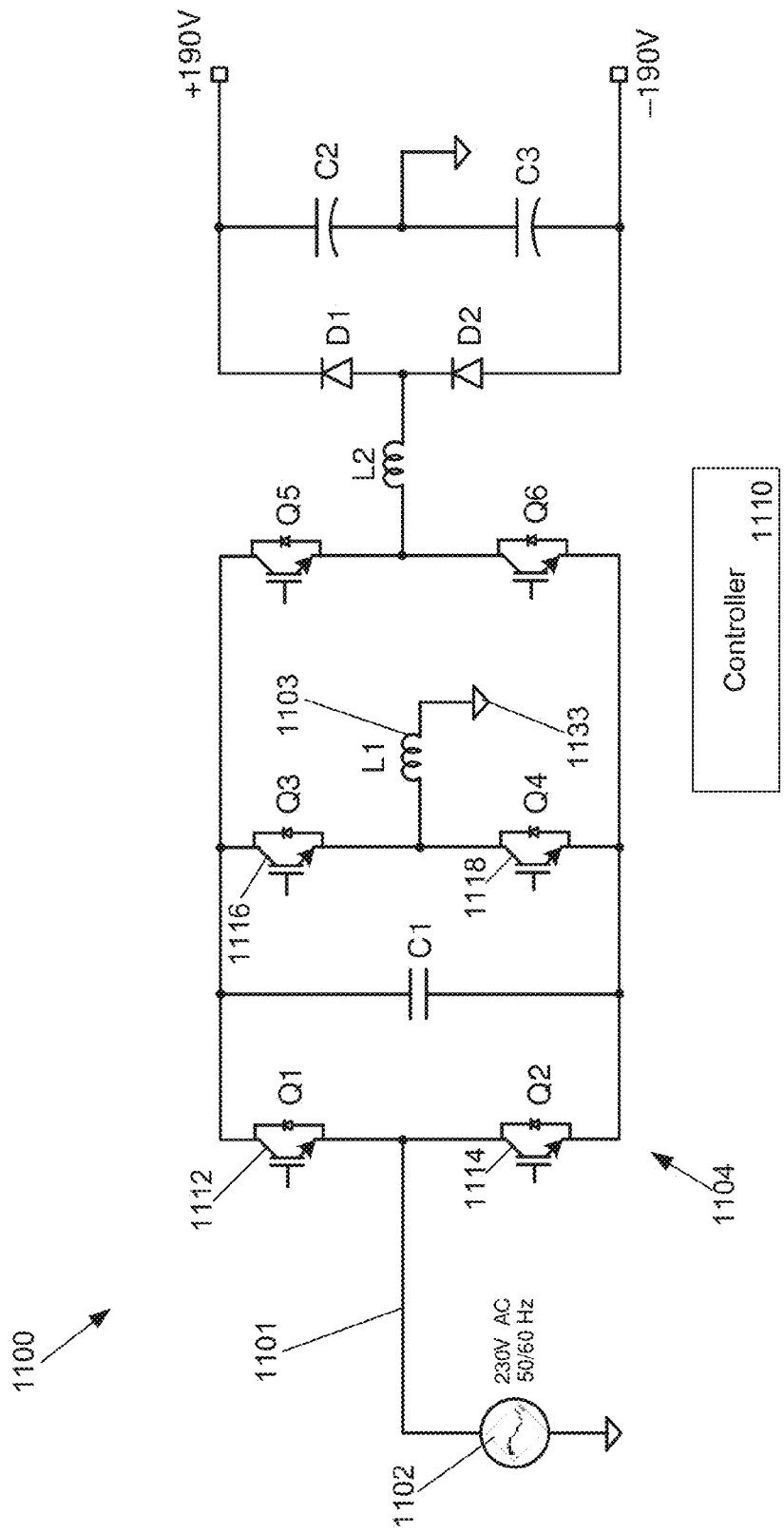
FIG. 11 is a circuit diagram of another embodiment of a non-isolated AC-DC conversion rectifier according to aspects of the current invention.

FIG. 11 is a circuit diagram of another embodiment of a non-isolated AC-DC conversion rectifier 1100 according to aspects of the current invention. The rectifier 1100 is substantially the same as the rectifier 100 described above with regard to FIG. 1, except that in the rectifier 100, the inductor L1 103 (shown in FIG. 1) has been moved such that the power source 1102 is coupled directly to the source of the first switch (Q1) 1112 and the drain of the second switch (Q2) 1114 via the input 1101, and the inductor L1 1103 is coupled between ground 1133 and switches Q3 (1116) and Q4 (1118).

Figure 12:
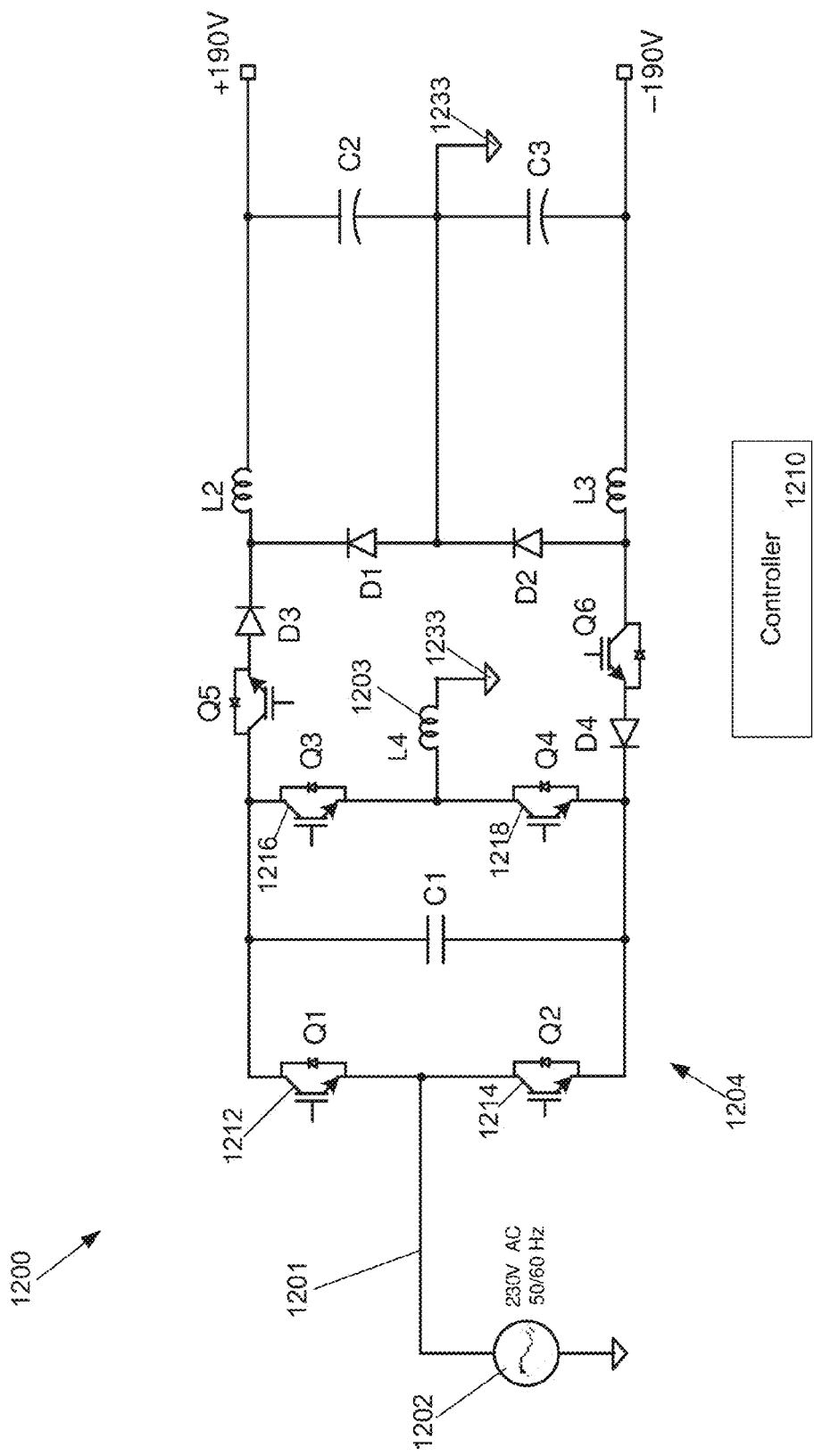
FIG. 12 is a circuit diagram of another embodiment of a non-isolated AC-DC conversion rectifier according to aspects of the current invention.

FIG. 12 is a circuit diagram of another embodiment of a non-isolated AC-DC conversion rectifier 1200 according to aspects of the current invention. The rectifier 1200 is substantially the same as the rectifier 400 described above with regard to FIG. 4, except that in the rectifier 1200, the inductor L1 403 (shown in FIG. 4) has been removed such that the power source 1202 is coupled directly to the source of the first switch (Q1) 1212 and the drain of the second switch (Q2) 1214 via the input 1201. In addition, rather than being coupled directly to ground 1133 (as shown in FIG. 4), the source of the third switch (Q3) 1216 and the drain of the fourth switch (Q4) 1218 are coupled to ground 1233 via an inductor L4 1203.

Figure 13:
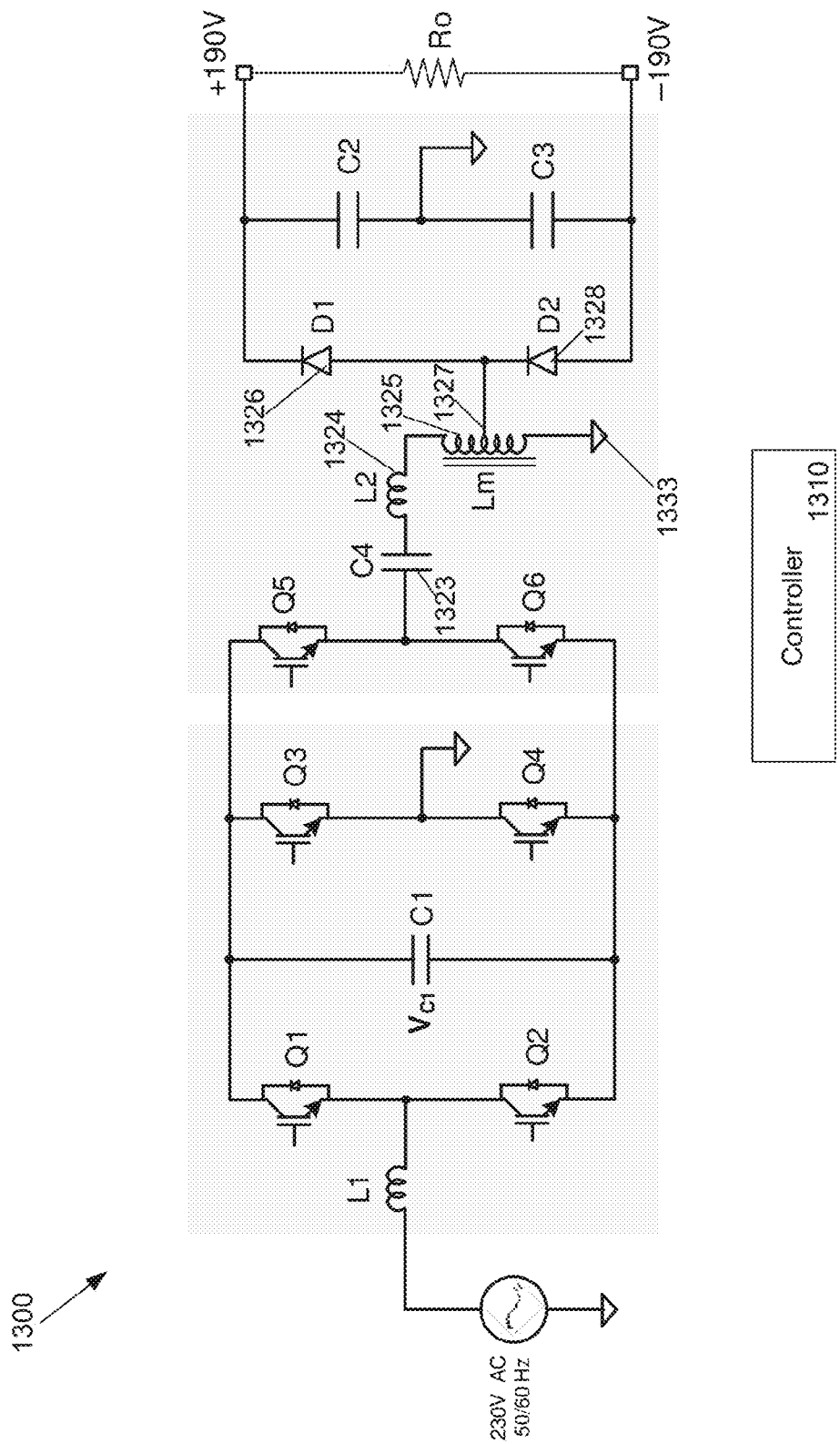
FIG. 13 is a circuit diagram of another embodiment of a non-isolated AC-DC conversion rectifier according to aspects of the current invention.

FIG. 13 is a circuit diagram of another embodiment of a non-isolated AC-DC conversion rectifier 1300 according to aspects of the current invention. The rectifier 1300 is substantially the same as the rectifier 600 described above with regard to FIG. 6, except that in the rectifier 1300, the anode of diode D1 1326 and the cathode of diode D2 1328 are coupled to the inductor Lm 1325 via a center tap 1327.

Figure 14:
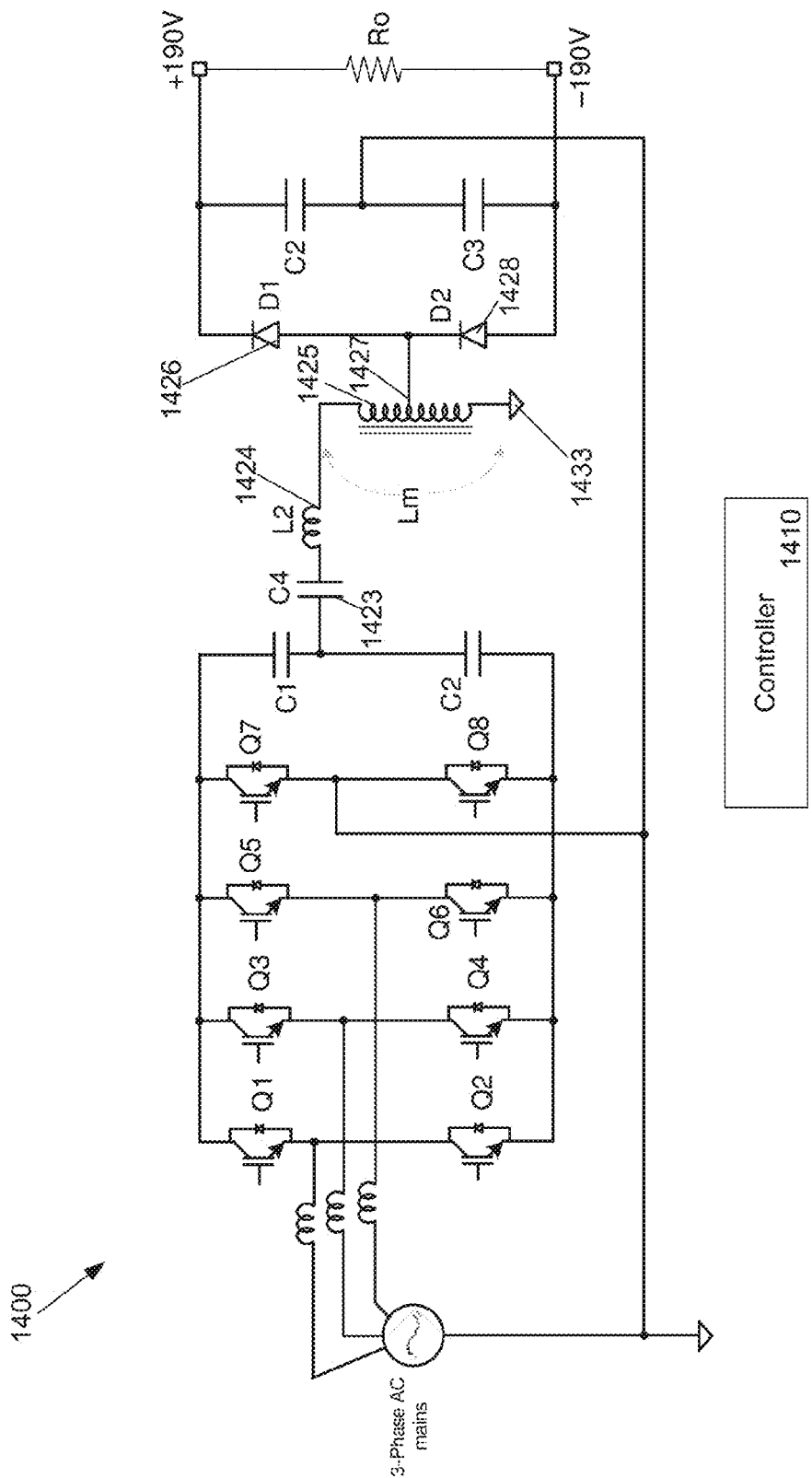
FIG. 14 is a circuit diagram of another embodiment of a non-isolated AC-DC conversion rectifier according to aspects of the current invention.

FIG. 14 is a circuit diagram of another embodiment of a non-isolated AC-DC conversion rectifier 1400 according to aspects of the current invention. The rectifier 1400 is substantially the same as the rectifier 1000 described above with regard to FIG. 10, except that in the rectifier 1400, the anode of diode D1 1426 and the cathode of diode D2 1428 are coupled to the inductor Lm 1425 via a center tap 1427.

Figure 15:
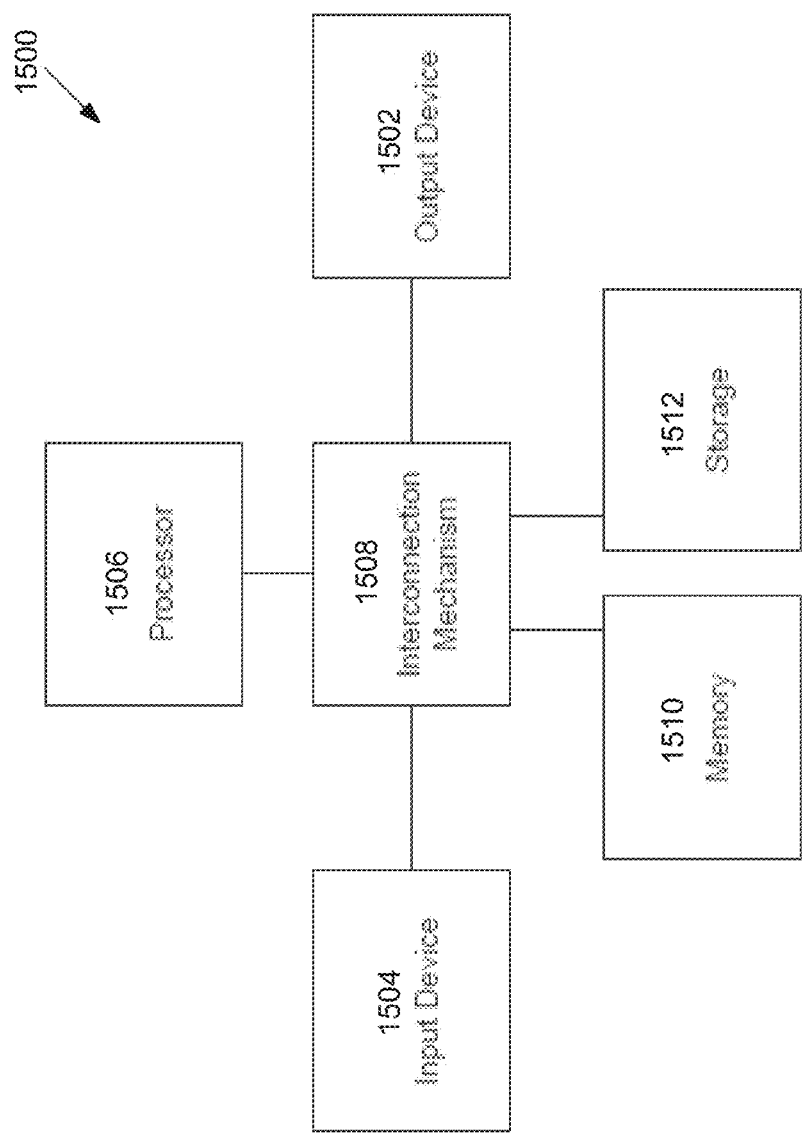
FIG. 15 is a block diagram of computing components forming a system which may be configured to implement one or more aspects of the current invention.

FIG. 15 illustrates an example block diagram of computing components forming a system 1500 which may be configured to implement one or more aspects disclosed herein. For example, the system 1500 may be communicatively coupled to a controller or included within a controller, and/or configured to balance loads coupled to each phase of a data center as discussed above.

The system 1500 may include for example a computing platform such as those based on Intel PENTIUM-type processor, Motorola PowerPC, Sun UltraSPARC, Texas Instruments-DSP, Hewlett-Packard PA-RISC processors, or any other type of processor. System 1500 may include specially-programmed, special-purpose hardware, for example, an application-specific integrated circuit (ASIC). Various aspects of the present disclosure may be implemented as specialized software executing on the system 1500 such as that shown in FIG. 15.

The system 1500 may include a processor/ASIC 1506 connected to one or more memory devices 1510, such as a disk drive, memory, flash memory or other device for storing data. Memory 1510 may be used for storing programs and data during operation of the system 1500. Components of the computer system 1500 may be coupled by an interconnection mechanism 1508, which may include one or more buses (e.g., between components that are integrated within a same machine) and/or a network (e.g., between components that reside on separate machines). The interconnection mechanism 1508 enables communications (e.g., data, instructions) to be exchanged between components of the system 1500.

The system 1500 also includes one or more input devices 1504, which may include for example, a keyboard or a touch screen. The system 1500 includes one or more output devices 1502, which may include for example a display. In addition, the computer system 1500 may contain one or more interfaces (not shown) that may connect the computer system 1500 to a communication network, in addition or as an alternative to the interconnection mechanism 1508.

The system 1500 may include a storage system 1512, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 1510 that allows for faster access to the information by the processor/ASIC than does the medium. This memory 1510 may be a volatile, random access memory such as a dynamic random access memory (DRAM) or static memory (SRAM). It may be located in storage system 1512 or in memory system 1510. The processor 1506 may manipulate the data within the integrated circuit memory 1510 and then copy the data to the storage 1512 after processing is completed. A variety of mechanisms are known for managing data movement between storage 1512 and the integrated circuit memory element 1510, and the disclosure is not limited thereto. The disclosure is not limited to a particular memory system 1510 or a storage system 1512.

The system 1500 may include a computer platform that is programmable using a high-level computer programming language. The system 1500 may be also implemented using specially programmed, special purpose hardware, e.g. an ASIC. The system 1500 may include a processor 1506, which may be a commercially available processor such as the well-known Pentium class processor available from the Intel Corporation. Many other processors are available. The processor 1506 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

According to at least one embodiment, the non-isolated AC-DC conversion rectifier described above is one of three rectifier sections of a 3-phase AC-DC conversion rectifier. However, in other embodiments, the non-isolated AC-DC conversion rectifier may stand alone and receive power from a single phase power source.

According to one embodiment, the output voltage of the non-isolated AC-DC conversion rectifier is +−190 Vdc; however, in other embodiments, the output voltage of the rectifier 100 may be configured differently.

According to one embodiment, the non-isolated AC-DC conversion rectifier described above is the front end of an AC UPS. For example, in one embodiment, a non-isolated AC-DC conversion rectifier within an AC UPS is coupled to an inverter via a DC bus and provides DC power to the DC bus. In another embodiment, a non-isolated AC-DC conversion rectifier is the front end of a DC UPS and provides DC power to a DC bus of the DC UPS. According to other embodiments, the non-isolated AC-DC conversion rectifier described above is utilized in a datacenter to provide high voltage DC power to a centralized battery and a corresponding DC distribution bus.

As described above, a non-isolated AC-DC rectifier includes output circuitry (e.g., an inverter and rectifier combination, multiple buck converters, or a resonant converter) that is operated to adequately charge output capacitors of the rectifier and to provide a desired output voltage to outputs of the rectifier. In other embodiments, the output circuitry may include any other type of circuitry appropriate for adequately charging the output capacitors of the rectifier and providing a desired output voltage to the outputs of the rectifier.

As described above, a non-isolated AC-DC rectifier topology is provided that may avoid the use of electrolytic capacitors and may have high reliability, high power density, low switching losses, and high efficiency.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An AC-DC rectifier comprising:
an input configured to be coupled to an AC power source and to receive input AC power from the AC power source having an input AC voltage waveform;
a positive output configured to provide a positive DC output voltage to a load;
a negative output configured to provide a negative DC output voltage to the load;
a first DC bus;
a second DC bus;
a capacitor coupled between the first DC bus and the second DC bus;
a converter coupled to the input, the first DC bus, and the second DC bus and configured to receive the input AC power from the input, the converter including a first switch coupled between the first DC bus and ground and a second switch coupled between the second DC bus and ground;
output circuitry coupled to the converter, the positive output, and the negative output;
a first output capacitor coupled between the positive output and ground;
a second output capacitor coupled between the negative output and ground; and
a controller coupled to the converter and the output circuitry, the converter configured, during a positive half line cycle of the input AC voltage waveform, to:
operate the first switch to remain in an open state;
operate the second switch to couple the second DC bus to ground;
operate the converter to maintain a positive DC link voltage on the first DC bus; and
operate the output circuitry to charge the first output capacitor and provide the positive DC output voltage to the positive output.

2. The AC-DC rectifier of claim 1, wherein during the positive half line cycle of the input AC voltage waveform, the second output capacitor is configured to discharge and provide the negative DC output voltage to the negative output.

3. The AC-DC rectifier of claim 2, wherein the controller is further configured, during a negative half line cycle of the input AC voltage waveform, to:
operate the second switch to remain in an open state;
operate the first switch to couple the first DC bus to ground;
operate the converter to maintain a negative DC link voltage on the second DC bus; and
operate the output circuitry to charge the second output capacitor and provide the negative DC output voltage to the negative output.

4. The AC-DC rectifier of claim 3, wherein during the negative half line cycle of the input AC voltage waveform, the first output capacitor is configured to discharge and provide the positive DC output voltage to the positive output.

5. The AC-DC rectifier of claim 4, wherein the output circuitry includes:
an inverter coupled to the converter; and
a rectifier circuit coupled to the inverter, the positive output, and the negative output,
wherein the inverter includes a third switch coupled between the first DC bus and the rectifier circuit and a fourth switch coupled between the second DC bus and the rectifier circuit, and
wherein during the positive half cycle of the input AC voltage waveform, the controller is further configured to operate the third switch in a first buck mode of operation such that the rectifier circuit generates the positive DC output voltage.

6. The AC-DC rectifier of claim 5, wherein during the negative half cycle of the input AC voltage waveform, the controller is further configured to operate the fourth switch in a second buck mode of operation such that the rectifier circuit generates the negative DC output voltage.

7. The AC-DC rectifier of claim 4, wherein the output circuitry includes:
a first buck converter coupled to the converter and the positive output, the first buck converter including a third switch coupled between the first DC bus and the positive output; and
a second buck converter coupled to the converter and the negative output, the second buck converter including a fourth switch coupled between the second DC bus and the negative output,
wherein during the positive half cycle of the input AC voltage waveform, the controller is further configured to operate the third switch in a first buck mode of operation to generate the positive DC output voltage.

8. The AC-DC rectifier of claim 7, wherein during the negative half cycle of the input AC voltage waveform, the controller is further configured to operate the fourth switch in a second buck mode of operation to generate the negative DC output voltage.

9. The AC-DC rectifier of claim 7, wherein the first buck converter includes a first inductor coupled between the third switch and the positive output,
wherein the second buck converter includes a second inductor coupled between the fourth switch and the negative output, and
wherein the first inductor and the second inductor are implemented on a common core.

10. The AC-DC rectifier of claim 1, wherein the controller is further configured to operate the converter and the output circuitry to provide Power Factor Correction (PFC) at the input.

11. The AC-DC rectifier of claim 1, wherein the capacitor is a polypropylene capacitor.

12. The AC-DC rectifier of claim 1, wherein the positive DC link voltage level is less than 400V.

13. A method for operating an AC-DC rectifier including an input configured to receive input AC power having an input AC voltage waveform, a first DC bus, a second DC bus, a capacitor coupled between the first DC bus and the second DC bus, a converter coupled to the input, the first DC bus, and the second DC bus, output circuitry coupled to the converter, a first output capacitor coupled to the output circuitry, and a second output capacitor coupled to the output circuitry, the method comprising:
receiving, with the converter, the input AC power from the input;
controlling, during a positive half line cycle of the input AC voltage waveform, the converter to couple the second DC bus to ground;

controlling, during the positive half line cycle of the input AC voltage waveform, the converter to maintain a positive DC link voltage on the first DC bus;

controlling, during the positive half line cycle of the input AC voltage waveform, the output circuitry to charge the first output capacitor and provide a positive output voltage to a positive output; and discharging, during the positive half line cycle of the input AC voltage waveform, the second output capacitor to provide a negative output voltage to a negative output.

14. The method of claim 13, further comprising:

controlling, during a negative half line cycle of the input AC voltage waveform, the converter to couple the first DC bus to ground;

controlling, during the negative half line cycle of the input AC voltage waveform, the converter to maintain a negative DC link voltage on the second DC bus;

controlling, during the negative half line cycle of the input AC voltage waveform, the output circuitry to charge the second output capacitor and provide the negative output voltage to the negative output; and discharging, during the negative half line cycle of the input AC voltage waveform, the first output capacitor to provide the positive output voltage to the positive output.

15. The method of claim 14, wherein controlling the converter to couple the first DC bus to ground includes closing a first switch coupled between the first DC bus and ground.

16. The method of claim 15, wherein controlling the converter to couple the second DC bus to ground includes closing a second switch coupled between the second DC bus and ground.

17. The method of claim 16, wherein controlling the converter to maintain the positive DC link voltage on the first DC bus includes providing Pulse Width Modulation (PWM) control signals to a third switch coupled between the input and the second DC bus to generate the positive DC link voltage.

18. The method of claim 17, wherein controlling the converter to maintain the negative DC link voltage on the second DC bus includes providing PWM control signals to a fourth switch coupled between the input and the first DC bus to generate the negative DC link voltage.

19. The method of claim 18, wherein controlling the output circuitry to charge the first output capacitor and provide the positive output voltage to the positive output includes providing PWM controls signals to a fifth switch coupled between the first DC bus and the positive output to generate the positive output voltage.

20. The method of claim 19, wherein controlling the output circuitry to charge the second output capacitor and provide the negative output voltage to the negative output includes providing PWM controls signals to a sixth switch coupled between the second DC bus and the negative output to generate the negative output voltage.

21. The method of claim 13, further comprising controlling the converter and the output circuitry to provide PFC at the input.

22. The method of claim 13, wherein controlling the converter to maintain the positive DC link voltage on the first DC bus includes controlling the converter to maintain the positive DC link voltage at a level less than 400V.

23. An AC-DC rectifier comprising:

an input configured to be coupled to an AC power source and to receive input AC power from the AC power source having an input AC voltage waveform;

a positive output configured to provide a positive output voltage a load;

a negative output configured to provide a negative output voltage to the load;

a first DC bus;

a second DC bus;

a capacitor coupled between the first DC bus and the second DC bus;

at least one converter coupled to the input, the first DC bus, and the second DC bus and configured to receive the input AC power from the input, the at least one converter including a first switch coupled between the first DC bus and ground and a second switch coupled between the second DC bus and ground;

output circuitry coupled to the at least one converter, the positive output, and the negative output;

a first output capacitor coupled between the positive output and ground;

a second output capacitor coupled between the negative output and ground; and a controller coupled to the at least one converter and the output circuitry, the at least one converter configured, during a positive half line cycle of the input AC voltage waveform, to:

operate the first switch to remain in an open state;

operate the second switch to couple the second DC bus to ground;

operate the at least one converter to maintain a positive DC link voltage on the first DC bus;

operate the output circuitry to transfer energy from the capacitor to the first output capacitor to charge the first output capacitor and provide the positive output voltage to the positive output; and operate the output circuitry to transfer energy from the capacitor to the second output capacitor to charge the second output capacitor and provide the negative output voltage to the negative output.

24. The AC-DC rectifier of claim 23, wherein the controller is further configured, during a negative half line cycle of the input AC voltage waveform, to:

operate the second switch to remain in an open state;

operate the first switch to couple the first DC bus to ground;

operate the at least one converter to maintain a negative DC link voltage on the second DC bus;

operate the output circuitry to transfer energy from the capacitor to the first output capacitor to charge the first output capacitor and provide the positive output voltage to the positive output; and operate the output circuitry to transfer energy from the capacitor to the second output capacitor to charge the second output capacitor and provide the negative output voltage to the negative output.

25. The AC-DC rectifier of claim 24, wherein the output circuitry includes a resonant converter coupled to the first DC bus, the second DC bus, the positive output, and the negative output.

26. The AC-DC rectifier of claim 25, wherein the resonant converter includes:

a third switch coupled to the first DC bus;

a fourth switch coupled to the second DC bus; and a resonant tank coupled to the third switch and the fourth switch;

wherein in controlling the output circuitry, during the positive half cycle or the negative half cycle of the input AC voltage waveform, to transfer energy from the capacitor to the first output capacitor and the second output capacitor, the controller is further configured to provide PWM signals to the third switch and the fourth switch to generate a unipolar pulse and provide the unipolar pulse to the resonant tank.

27. The AC-DC rectifier of claim 26, wherein the resonant tank includes:
a resonant capacitor coupled to the third switch and the fourth switch; and
a resonant inductor coupled to the resonant capacitor,
wherein the resonant capacitor is configured to receive the unipolar pulse, generate a bipolar pulse based on the unipolar pulse, and provide the bipolar pulse to the resonant inductor.

28. The AC-DC rectifier of claim 27, wherein the resonant converter further includes:
a first diode coupled between the resonant inductor and the positive output, the first diode configured to pass energy derived from a positive portion of the bipolar pulse to the first output capacitor to charge the first output capacitor and provide the positive output voltage to the positive output; and
a second diode coupled between the resonant inductor and the negative output, the second diode configured to pass energy derived from a negative portion of the bipolar pulse to the second output capacitor to charge the second output capacitor and provide the negative output voltage to the negative output.

29. The AC-DC rectifier of claim 28, wherein the controller is further configured to provide 50% duty cycle complementary PWM signals to the third switch and the fourth switch to generate the unipolar pulse.

30. The AC-DC rectifier of claim 26, wherein the controller is further configured to turn on the third switch and the fourth switch with zero-voltage switching.

31. The AC-DC rectifier of claim 30, wherein the controller is further configured to turn on the third switch and the fourth switch when current through each switch is negative.

32. The AC-DC rectifier of claim 23, wherein the controller is further configured to operate the at least one converter to maintain the positive DC link voltage at a level less than 400V.

33. The AC-DC rectifier of claim 23, wherein the capacitor, the first output capacitor, and the second output capacitor are polypropylene based capacitors.

34. The AC-DC rectifier of claim 23, wherein the at least one converter includes three converters, each of the three converters configured to be coupled to a 3-phase AC power source and to receive one phase of 3-phase power provided by the 3-phase power source.

35. A method for operating an AC-DC rectifier including an input configured to receive input AC power having an input AC voltage waveform, a first DC bus, a second DC bus, a capacitor coupled between the first DC bus and the second DC bus, a converter coupled to the input, the first DC bus, and the second DC bus, output circuitry coupled to the converter, a first output capacitor coupled to the output circuitry, and a second output capacitor coupled to the output circuitry, the method comprising:
receiving, with the converter, the input AC power from the input;
controlling, during a positive half line cycle of the input AC voltage waveform, the converter to couple the second DC bus to ground;
controlling, during the positive half line cycle of the input AC voltage waveform, the converter to maintain a positive DC link voltage on the first DC bus;
controlling, during the positive half line cycle of the input AC voltage waveform, the output circuitry to transfer energy from the capacitor to the first output capacitor to charge the first output capacitor and provide a positive output voltage to a positive output; and
controlling, during the positive half line cycle of the input AC voltage waveform, the output circuitry to transfer energy from the capacitor to the second output capacitor to charge the second output capacitor and provide a negative output voltage to a negative output.

36. The method of claim 35, further comprising:
controlling, during a negative half line cycle of the input AC voltage waveform, the converter to couple the first DC bus to ground;
controlling, during the negative half line cycle of the input AC voltage waveform, the converter to maintain a negative DC link voltage on the second DC bus;
controlling, during the negative half line cycle of the input AC voltage waveform, the output circuitry to transfer energy from the capacitor to the first output capacitor to charge the first output capacitor and provide the positive output voltage to the positive output; and
controlling, during the negative half line cycle of the input AC voltage waveform, the output circuitry to transfer energy from the capacitor to the second output capacitor to charge the second output capacitor and provide the negative output voltage to the negative output.

37. The method of claim 36, wherein the output circuitry includes a resonant converter having a resonant tank, a third switch coupled between the first DC bus and the resonant tank, and a fourth switch coupled between the second DC bus and the resonant tank, and
wherein controlling the output circuitry, during the positive half cycle or the negative half cycle of the input AC voltage waveform, to transfer energy from the capacitor to the first output capacitor and the second output capacitor includes providing PWM signals to the third switch and the fourth switch to generate a unipolar pulse.

38. The method of claim 37, wherein providing PWM signals to the third switch and the fourth switch includes providing 50% duty cycle complementary PWM signals to the third switch and the fourth switch to generate the unipolar pulse.

39. The method of claim 37, wherein controlling the output circuitry, during the positive half cycle or the negative half cycle of the input AC voltage waveform, to transfer energy from the capacitor to the first output capacitor and the second output capacitor further includes generating, with the resonant tank, a bipolar pulse based on the unipolar pulse.

40. The method of claim 39, wherein controlling the output circuitry, during the positive half cycle or the negative half cycle of the input AC voltage waveform, to transfer energy from the capacitor to the first output capacitor and the second output capacitor further includes passing, with the resonant converter, energy derived from a positive portion of the bipolar pulse to the first output capacitor and passing, with the resonant converter, energy derived from a negative portion of the bipolar pulse to the second output capacitor.

* * * * *